(12) United States Patent
Yang

(10) Patent No.: US 6,707,679 B2
(45) Date of Patent: Mar. 16, 2004

(54) BUTT JOINED OPTO-ELECTRONIC MODULE

(75) Inventor: Kei-Wean C. Yang, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 53 days.

(21) Appl. No.: 10/155,110

(22) Filed: May 23, 2002

(65) Prior Publication Data

US 2003/0179539 A1 Sep. 25, 2003

Related U.S. Application Data

(60) Provisional application No. 60/366,357, filed on Mar. 20, 2002.

(51) Int. Cl.⁷ .................................................. H05K 5/04
(52) U.S. Cl. ....................... 361/752; 361/800; 361/809; 361/797; 385/92; 385/94
(58) Field of Search ................. 361/715, 752, 361/797, 800, 804, 809, 810; 385/92, 88, 94, 129

(56) References Cited

U.S. PATENT DOCUMENTS

| 4,129,897 A | 12/1978 | Telewski et al. |
| 4,702,547 A | 10/1987 | Enochs |
| 5,412,748 A * | 5/1995 | Furuyama et al. ............ 385/92 |
| 5,583,468 A | 12/1996 | Kielmeyer et al. |
| RE35,869 E | 8/1998 | Mohwinkel |
| 6,058,234 A * | 5/2000 | Tachigori ..................... 385/49 |
| 6,271,579 B1 | 8/2001 | Going et al. |
| 6,292,052 B1 | 9/2001 | Carlson |
| 6,574,379 B2 * | 6/2003 | Miyazaki ....................... 385/1 |

FOREIGN PATENT DOCUMENTS

EP    1050768 A1  *  5/1999

* cited by examiner

Primary Examiner—David Martin
Assistant Examiner—Hung Bui
(74) Attorney, Agent, or Firm—William K. Bucher

(57) ABSTRACT

A butt joined electronic module has first and second coplanar transmission structures that are independently aligned in a proximate abutting relationship. The coplanar transmission structures are formed on respective first and second electrical elements that are secured on respective independently positioned and mechanically joined carrier and housing. The first and second coplanar transmission structures are electrically coupled together via substantially flat electrical conductors. The carrier and housing are bonded together as a single module.

27 Claims, 17 Drawing Sheets

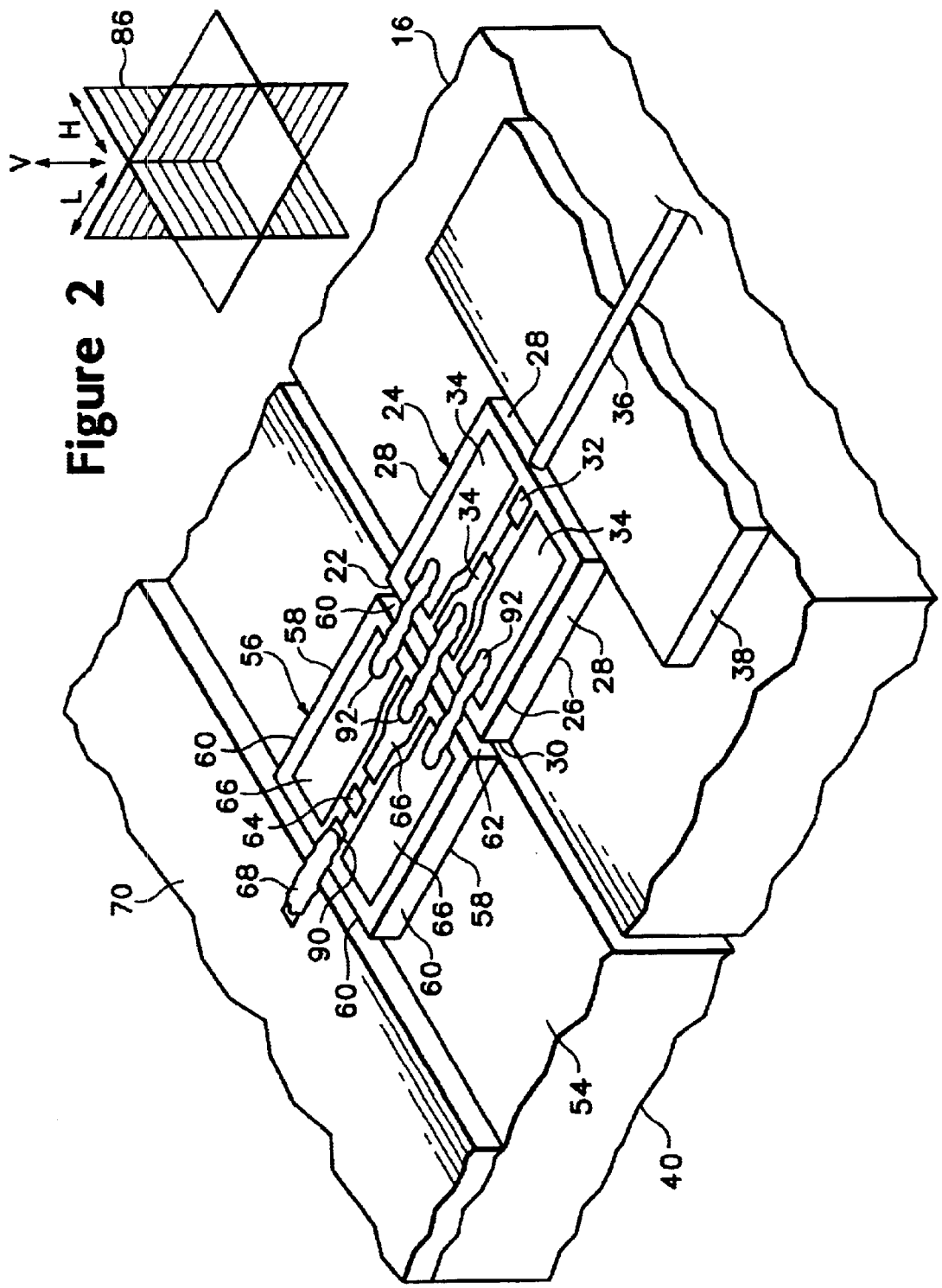

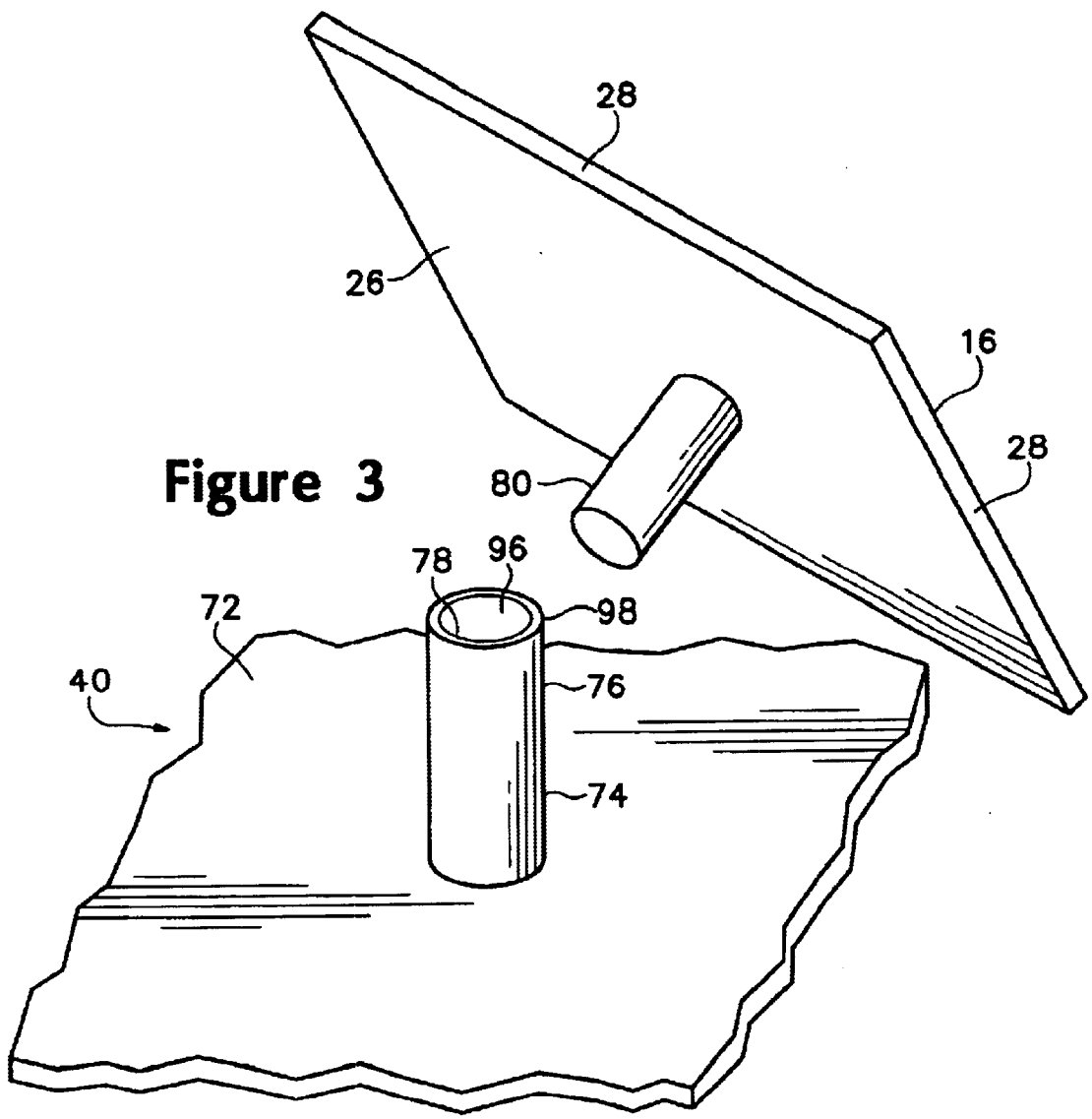

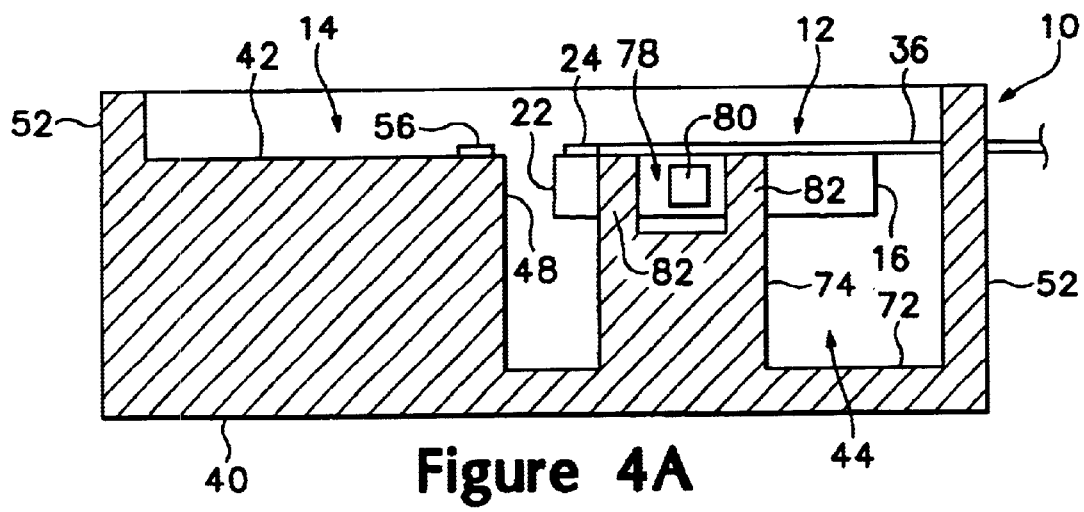
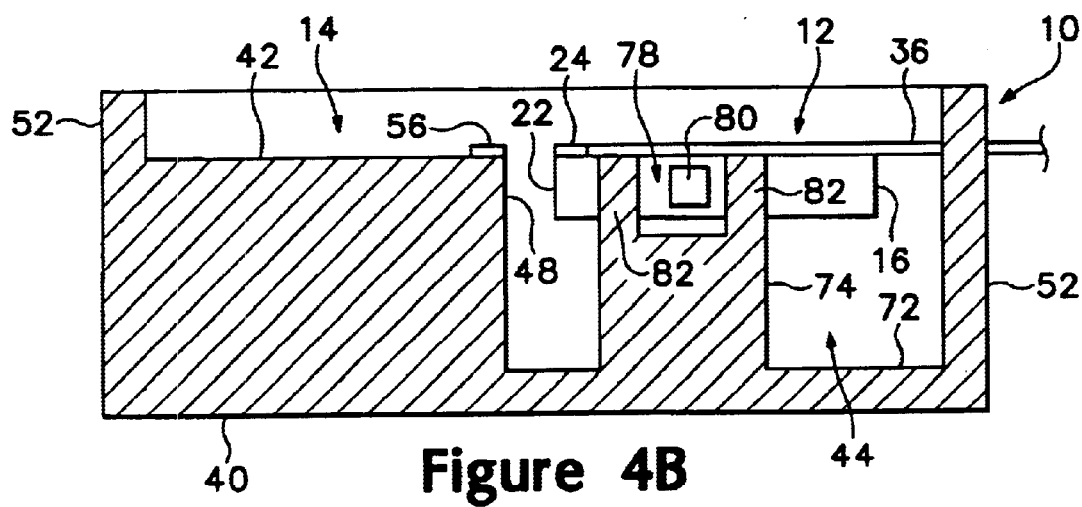
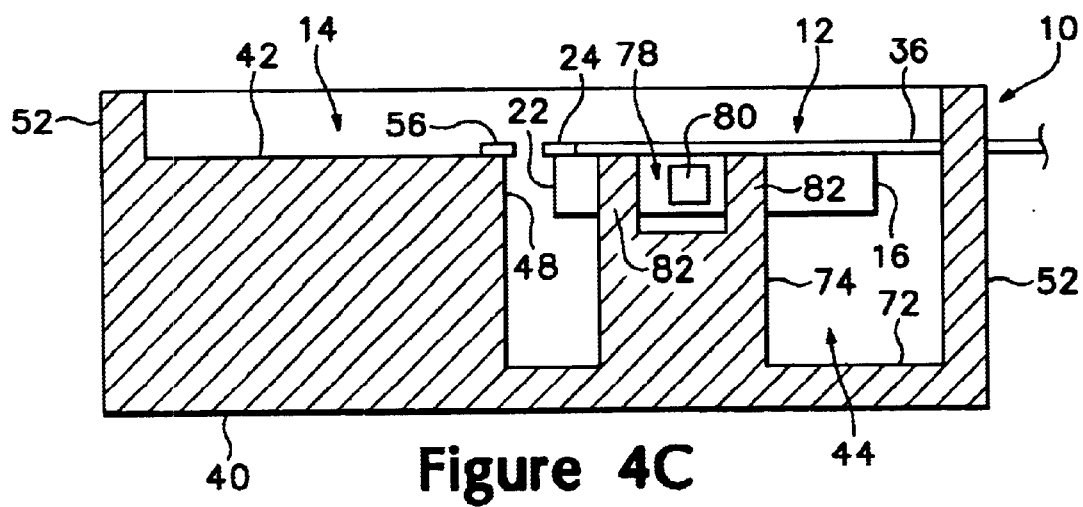

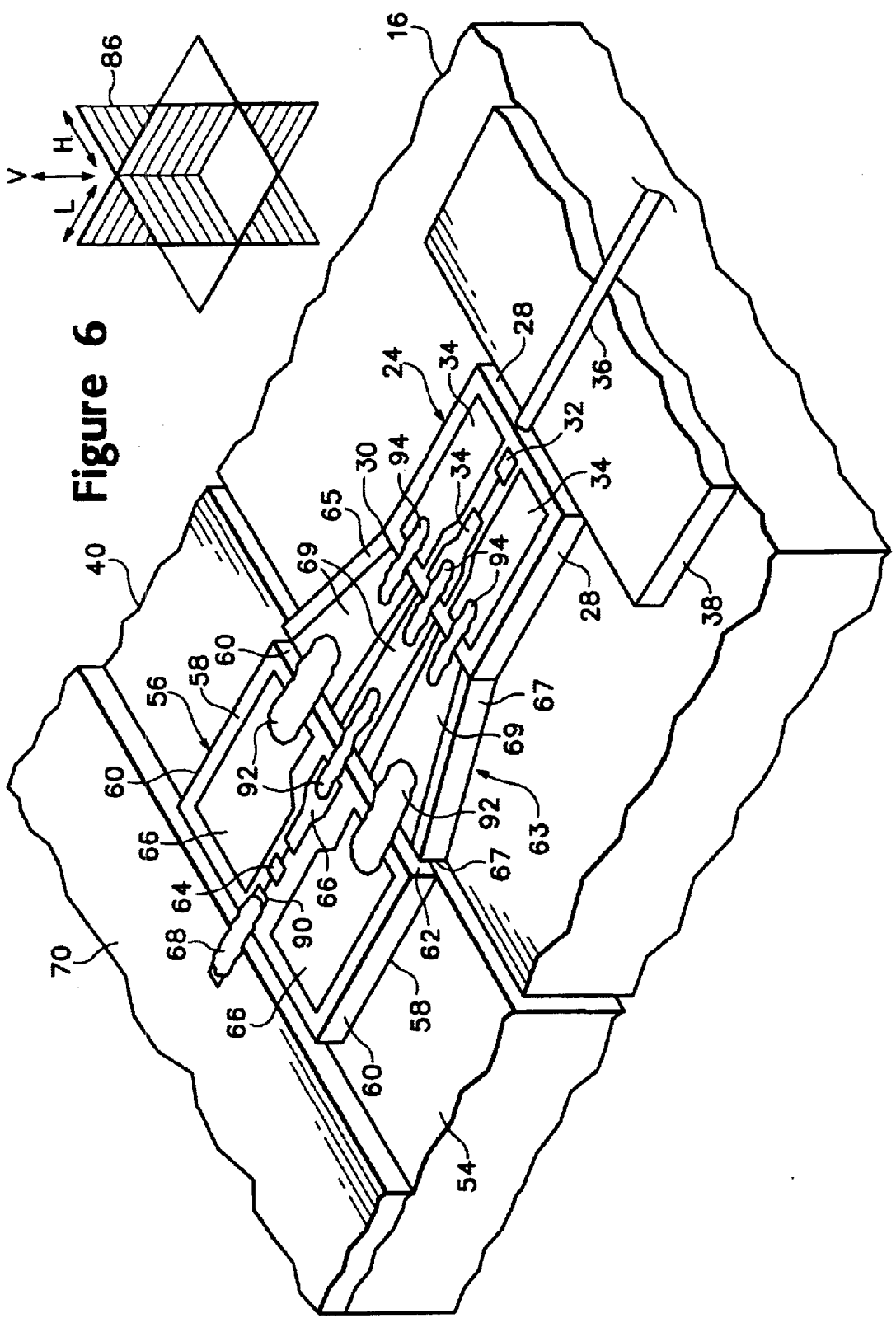

BUTT JOINED OPTO-ELECTRONIC MODULE

CROSS-REFERENCE TO RELATED APPLICATION

This application claims the benefit of the U.S. Provisional Application No. 60/366,357, filed Mar. 20, 2002.

BACKGROUND OF THE INVENTION

The present invention relates generally to electronic modules and more particularly to a butt joined opto-electronic module operating at millimeter wavelength frequencies.

Recent advancements in optical communications technology have demonstrated optical data demuxing at a speed of over 160 Gbit/sec through a single mode optical fiber. At the same time, there is a lack of corresponding progress in test and measurement instrumentation to support analyzing these fast optical pulses. Current solutions are limited by interconnect issues that limit bandwidth and signal integrity, and manufacturing issues that can substantially increase the cost of components. One commercial solution is to couple an enclosed photodetector module with a conventional enclosed sampling head using a coaxial transmission line. The coupled modules are mounted in an optical plug-in module for a sampling oscilloscope. Another solution is to buy a high-speed photodetector as the optical-to-electrical (O/E) converter and use a sampling oscilloscope to capture the signal. This approach seems more beneficial for users because, in addition to having to spend less money, they can also maintain the electrical input to the scope for other testing needs. The inconvenience to users is that the screen is no longer calibrated for accurate power measurements. However, this inconvenience can be overcome by purchasing a separate power meter and perform a calibration manually. Users are faced with the choice of spending more money for the added power level calibration feature of an optical plug-in module or save $10 to 15 thousand dollars by buying a photodetector separately such that both electrical inputs and optical inputs can be measured with the same investment. The latter choice also provides users with a power meter which can be used elsewhere as well.

A common weakness for the above two solutions is that they both need electrical interconnections to connect the photodetector output to the sampler input. Because of the high frequencies involved, the connectors are quite expensive. Moreover, aside from introducing additional costs to the system, these components also introduce unwanted impedance mismatching that produce signal reflections. These signal reflections result in waveform distortion as a function of bit pattern when measuring fast repetitive signals, such as the RZ 40 Gb/Sec optical data.

A solution to these problems is to combine the detector and sampler semiconductor devices together to form a fully integrated photodetector-sampler IC design. This would eliminate all of the interconnecting hardware between the photodiode and sampler. While a fully integrated photodetector-sampler design (FIPS) sounds good, it runs into practical problems during implementation. Generally, test equipment manufactures are not vertically integrated companies that have the processing technology or the equipment to produce FIPS designs. In addition, high speed photodetector manufacturers generally specialize in producing optical components, such as O/E and E/O converters, but not electrical components, such as electrical samplers. Conversely, electrical component manufactures do not manufacture optical components. To produce the FIPS design would require capital investment and technology development by optical or electrical component manufactures or the test and measurement equipment manufacturer.

Another issue with the FIPS design is yield loss of the final assembly if either of the optical detector or sampler sections develop problems. The photodiode performance cannot be accurately characterized until permanently mounted on or within a carrier or housing, an optical fiber aligned to the photodiode, and electrically coupled to the sampler section. If the output of the competed FIPS device does not meet design specifications, it is difficult to determine if the problem has to do with the fiber alignment, photonic and impulse responses of the diode, polarization sensitivity and the like in the optical detector section or signal gain, sensitivity and the like in the sampler section. Even if the performance problem can be identified to one of the sections, replacing the defective section may lead to damage of the other section.

Another problem with the FIPS design is negotiating refunds on defective parts. Since different manufacturers make the components for the optical and sampler sections and one or the other or a system integrator, such as the test and measurement manufacturer, performs the final integration, determining the cause of the failed part or parts in the sections can be a source of conflict. For example, the problem may be determined within the photodetector module, say a lower than spec photo response. The problem could have been caused by the photodiode die being damaged during the FIPS processing; the optical fiber being misaligned from the integrator assembly process; the optical fiber end surface polishing being flawed; the fiber/detector IC junction having foreign contaminations not readily visible to the eye; the wire bond from the detector IC to the sampler IC having excessive inductance introduced by improper wirebonding; the wirebonder damaging the detector IC by improper bonding control, such as excess bond head ultrasonic energy or pressure, and the like. The photodetector IC manufacturer may be reluctant to refund the cost of the multi-thousand dollars detector IC where the defect is caused by a defective assembly process.

What is needed is an electronic module design that overcomes the shortcomings of the FIPS and the coaxial interconnect designs. The electronic module design should allow independent testing and verification of separate sections of the assembly prior to final assembly or integration. The electronic module should allow for easy assembly and alignment of the separate device sections down to the micron level.

SUMMARY OF THE INVENTION

Accordingly, the present invention is to a butt joined opto-electronic module for millimeter wavelength frequencies that allows independent alignment of coplanar transmission structures formed on opto-electrical and electrical elements in a proximate abutting relationship. The opto-electrical and electrical elements are mounted on respective independently positioned and mechanically joined open end face carrier and housing. The butt joined opto-electronic module has a housing with juxtaposed shallow and deep cavities defining an open end face between the shallow and deep cavities. An electrical element is positioned in the shallow cavity and has an electrical device formed on at least one horizontal surface of the electrical element. The deep cavity has at least a first upward extending strut with the upper portion of the strut having a securing member formed therein. A carrier is positioned on the strut and had an open end face and opposing horizontal surfaces. The carrier has at least a first tine extending from the carrier that engages the strut. An opto-electrical element is positioned on the carrier with an opto-electrical device formed on at least one horizontal surface of the opto-electrical element and coupled to receive an optical signal from an optical waveguide secured to the carrier.

Each of the opto-electrical and electrical elements has a coplanar transmission structure formed on one of the horizontal surfaces. Each coplanar transmission structure is electrically coupled to one of the respective opto-electrical and electrical devices. The coplanar transmission structures are independently aligned in three mutually perpendicular planes and positioned in a proximate abutting relationship. The carrier and/or the housing are linearly and rotationally positionable in three mutually perpendicular planes relative to the open end faces to align the first and second coplanar transmission structures. The carrier and the housing are independently positioned in a proximate abutting relationship at the open end faces and mechanically joined together as a single assembly by securing the carrier tine to the securing member of the strut by soldering, applying an adhesive or the like. Substantially flat electrical conductors, such as wedge bonded electrical conductors, electrically couple the first and second coplanar transmission structures together. The housing has a removable top cover mounted over the shallow and deep cavities.

In a first embodiment, the securing member is an axial bore formed in the upper portion of the strut. The tine extends from the under side of the carrier and is positioned in the axial bore. In the preferred embodiment, the housing has a second upward extending strut having a securing member formed in the upper portion of the strut. The securing member has upward extending tabs extending from the top of the struts defining a recessed region between the tabs. The carrier has opposing side surfaces with tines extending from each of the side surfaces. The tines are received in the recessed regions of the struts. The carrier is secured to the housing by applying a bonding material to the tines and the struts. The bonding material may include a low temperature solder, a strong adhesion low melting temperature metal, and adhesive, such as epoxy, and the like.

One or both of the opto-electrical and electrical elements may be positioned on the carrier and in the shallow cavity of the housing away from the open end faces of the carrier and the housing. One or both of the opto-electrical and electrical elements may also extend to the open end faces of the carrier and the housing or one or both may extend past the open end faces of the carrier and the housing. Each of the elements may be positioned on their respective carrier and shallow cavity in any of the above positioning relationships so long as the proximate abutting relationship of the coplanar transmission structures produces a sub-millimeter separation between the ends of the coplanar transmission structures. For example, the opto-electrical element may be set back from the open end face of its carrier and the electrical element may extend past the open end face in the housing.

A mounting dielectric substrate may be mounted on one or both of the carrier and the shallow cavity in the housing. Each substrate has an end face that may be positioned away from the open end faces of the carrier and the housing, extend to the open end faces of the carrier and the housing, or extend past the open end faces of the carrier and the housing. The opto-electrical and electrical elements are secured to the mounting dielectric substrates with each element positionable away from, extending to or extending past the end face of its mounting dielectric substrate. Multiple positioning combinations of the substrate or substrates may be combined with the multiple positioning combinations of the opto-electrical and electrical elements. For example, the opto-electrical carrier may have the mounting dielectric substrate positioned away from the open end face of the carrier with the opto-electrical element extending past the end face of the mounting dielectric substrate. The electrical element may be positioned in the shallow cavity of the housing with the electrical element extending past the open end face in the housing. In another example, the carrier and the shallow cavity may each have a mounting dielectric substrate mounted thereon. The mounting dielectric substrates may both extend past the open end faces of the carrier and the housing with the opto-electrical and electrical elements extending past the end faces of their respective mounting dielectric substrates.

The opto-electrical module may also have a standoff dielectric substrate positioned in an abutting relationship with at least one of the opto-electrical and electrical elements. The standoff dielectric substrate has opposing vertical walls and a horizontal surface on which is formed a coplanar transmission structure. The coplanar transmission structure on the standoff dielectric substrate extends to two of the opposing end walls of the substrate and is positioned in a coplanar relationship with the abutting opto-electric or electrical element and electrically couple via substantially flat electrical conductors. The coplanar transmission structures of the standoff dielectric substrate and the other of the opto-electrical and electrical elements are independently aligned in three mutually perpendicular planes and positioned in a proximate abutting relationship. The invention may also be implemented with a standoff dielectric substrate abutting each of the opto-electrical and electrical elements with the coplanar transmission structures of the standoff dielectric substrates being independently aligned in three mutually perpendicular planes and in a proximate abutting relationship. One end wall of each of the standoff dielectric substrates may be positioned away from the open end faces of the carrier and the housing, extend to the open end faces of the carrier and the housing, or extend past the open end faces of the carrier and the housing. The standoff dielectric substrate or substrates may mounted on a mounting dielectric substrate or substrates with the standoff dielectric substrates. One end wall of each of the standoff dielectric substrates may be positioned away from the end face or faces of the mounting dielectric substrate or substrates, extend to the end face or faces of the mounting dielectric substrate or substrates, or extend past the end face or faces of the mounting dielectric substrate or substrates.

The opto-electrical device formed on the opto-electrical element may be an optical-to-electrical converter, such as a photodiode, a semiconductor laser, an optical modulator or other types of devices that receives an electrical signal to generate or modulate an optical device or generates an electrical signal in response to a received optical signal. The electrical device formed on the electrical element may be at least a first sampling diode of a sampling circuit, a laser driver, an amplifier or the like.

The objects, advantages and novel features of the present invention are apparent from the following detailed description when read in conjunction with appended claims and attached drawings.

BRIEF DESCRIPTION OF THE DRAWINGS

FIG. 2 is a detailed perspective view of the joined optical and electrical elements of the butt joined opto-electronic module according to the present invention.

FIG. 3 is an alternative embodiment of the securing member and tine arrangement in the butt joined opto-electronic module according to the present invention.

FIGS. 4A–4L are side views of various configurations of the elements in the butt joined opto-electronic module according to the present invention.

FIG. 6 is a detailed perspective view of an alternative standoff dielectric substrate abutting one of the optical and electrical elements of the butt joined opto-electronic module according to the present invention.

DETAILED DESCRIPTION OF THE PREFERRED EMBODIMENT

Figure 1:
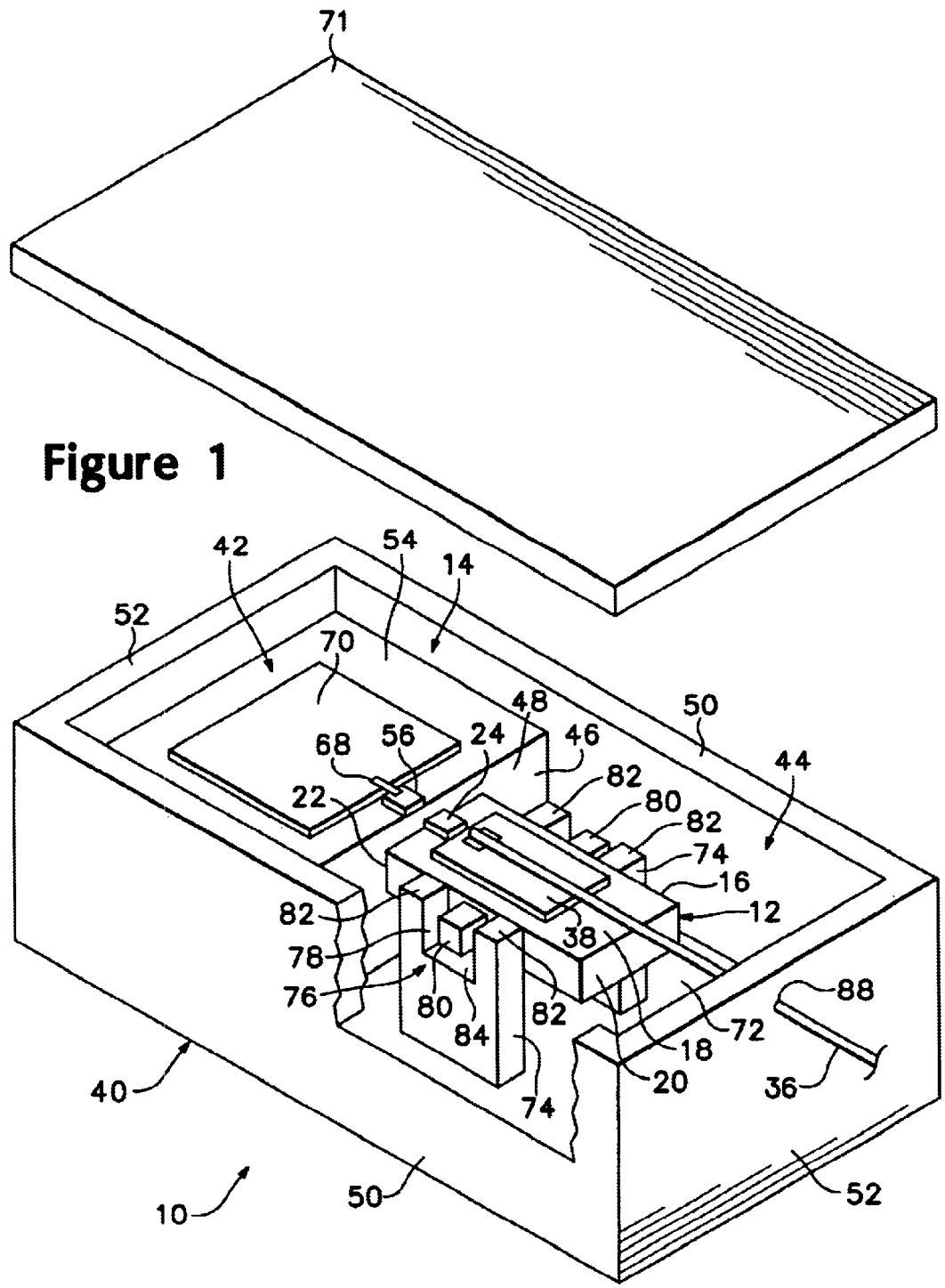
FIG. 1 is a perspective view illustrating the butt joined opto-electronic module according to the present invention.

The butt joined opto-electronic module of the present invention has independently positioned and mechanically joined open end faced opto-electrical and electrical sections for aligning in a proximate butt joined relationship coplanar transmission structures positioned on the opto-electrical and electrical sections. The butt joined opto-electronic module couples extremely high frequency electrical signals, in the range of 30 GHz. to 300 GHz, between the coplanar transmission structures of the opto-electrical and electrical sections. FIG. 1 show a perspective view of the butt joined opto-electronic module 10 having an opto-electrical section 12 and an electrical section 14. The opto-electrical section has a carrier 16 having opposing horizontal surfaces 18 and side surfaces 20 with one of the side surfaces defining an open end face 22. The carrier 16 is made of any suitable solid material that provides a rigid base for receiving optical components, substrates and the like. Such materials include, but not limited to, metals such as brass or the like, glass, plastic and the like. An opto-electrical element 24 is positioned on the carrier 16 and secured using an adhesive, such as a conductive or non-conductive epoxy. The opto-electrical element 24 (as best shown in FIG. 2) has opposing horizontal surfaces 26 and side surfaces 28 with one of the side surfaces defining an end face 30. An opto-electrical device 32, such as an optical-to-electrical converter implemented as a semiconductor photodiode, a semiconductor laser, an optical modulator or the like, is formed on one of the horizontal surfaces 26 of the opto-electrical element 24. A coplanar transmission structure 34 is formed on one of the horizontal surfaces 26 and has one end electrically coupled to the opto-electrical device 32. The other end of the coplanar transmission structure 34 is disposed adjacent to the end face 30 of the opto-electrical element 24. An optical waveguide 36, such as an optical fiber, may be mounted on a substrate 38 as is described in U.S. Pat. No. 4,702,547, titled "Method for Attaching an Optical Fiber to a Substrate to form an Optical Fiber Package". The optical waveguide 36 is optically aligned with the opto-electrical device 32 for coupling an optical signal to or from the opto-electrical device 32. Alternately, the optical waveguide 36 may be formed as part of the substrate 38 and optically aligned with the opto-electrical device 32. The optical fiber is then optically aligned with the substrate optical waveguide.

The electrical section 14 is part of a housing 40 having juxtaposed shallow and deep cavities 42 and 44. The interface between the two cavities 42 and 44 forms a vertical wall 46 defining an open end face 48. Opposing sidewalls and end walls 50 and 52 extend from the periphery of the shallow and deep cavities 42 and 44. The shallow cavity has a horizontal surface 54 on which is positioned an electrical element 56 and secured using an adhesive, such as a conductive or non-conductive epoxy. The electrical element 56 (as best shown in FIG. 2) has opposing horizontal surfaces 58 and side surfaces 60 with one of the side surfaces defining an end face 62. The electrical element 56 is preferably formed of a semiconductor material and has an electrical device 64, such as a sampling diode, laser driver, amplifier or the like, formed on one of the horizontal surfaces 58. A coplanar transmission structure 66 is formed on one of the horizontal surfaces 58 and has one end electrically coupled to the electrical device 64. The other end of the coplanar transmission structure 66 is disposed adjacent to the end face 62 of the electrical element 56. The electrical element 56 is electrically coupled via an electrical conductor 68, such as bond wires, gold foil and the like, to a substrate 70 mounted on the horizontal surface 54 of the shallow cavity 42 having additional electronic circuitry formed thereon. A removable top cover 71 is positioned on the sidewalls and end walls 50 and 52 to prevent stray signals from interfering with the electrical signals of the opto-electronic module 10 and to prevent foreign materials from entering the module.

The deep cavity 44 has a bottom surface 72 from which at least a first strut 74 extends upward. The upper portion 76 of the strut 74 has a securing member 78 formed therein that receives at least a first tine 80 formed on the carrier 16. In the preferred embodiment shown in the FIG. 1, the housing 40 has two struts extending from the bottom surface 72 of the deep cavity 44. The securing member 78 has tabs 82 extending upward from the struts 74 forming a recess 84 in the top of the struts 74. Laterally extending tines 80 extend from the sides surfaces 20 of the carrier 16. The dimensions of the times 80 and the securing member recesses 84 are such that the open end face 22 of the carrier 16 and open end face 48 in the housing 40 are linearly and rotationally positionable relative to each other in three mutually perpendicular planes as represented by the mutually orthogonal planes 86. The carrier 16 and housing 40 are moveable up-and-down in the vertical direction, side-to-side in the horizontal direction and in-and-out in the lateral direction. The struts 74 may also be formed as part on the interior walls of the deep cavity 44.

FIG. 2 is a closeup perspective view of the butt joined interface between the carrier 16 and the housing 40 and the coplanar transmission structures 34 and 66. In the preferred embodiment, the opto-electronic element 24 is formed of a semiconductor material with the opto-electrical device 32 being an optical-to-electrical converter. The optical-to-electrical converter 32 is preferably a photodetector having heterojunction structures bases on III–V semiconductor materials, such as an indium-phosphate (InP) semiconductor photodiode manufactured and sold by u2t Photonics GmbH, Berlin, Germany. The photodiode 32 is formed at one end of the opto-electrical element 24 and is electrically coupled to the center conductor of the coplanar transmission structure 34 formed on the top horizontal surface of the opto-electrical element. The other end of the coplanar transmission structure 34 is disposed adjacent to the opposing end face 30 of the opto-electrical element 24. The opto-electrical element 24 is positioned and secured to the carrier 14 with the end face 30 adjacent to the open end face 22 of the carrier to provide micron separation between the coplanar transmission structures 34 and 66. Electrical leads (not shown) couple electrical power to the semiconductor photodiode 32. The dielectric substrate 38 has the optical waveguide 36 formed therein and is positioned adjacent to and optically aligned with the photodiode 32 to provide optimum optical energy input to the photodiode. An optical fiber extending through an aperture 88 form in one of the end walls 52 is optically aligned with the waveguide 36 for coupling an optical signal through the waveguide 36 and onto the photodiode 32.

Alternately, the opto-electrical device 32 may be formed on one of the horizontal surfaces 26 of the opto-electrical element 24 and the coplanar transmission structure 34 may be formed on the opposing horizontal surface 26. Electrically conductive vias couple the electrical output of the opto-electrical device 32 to the coplanar transmission structure 34.

The electrical element 56 is preferably a gallium-arsenide semiconductor device having at least a first sampling diode 64 formed thereon forming a sampling circuit. Preferably, the semiconductor device has more than one sampling diode 64 forming the sampling circuit, such as the sampling circuit described in U.S. Pat. No. 6,292,052, titled "Output Amplifier for a Discrete Filter-Les Optical Reference Receiver". The sampling diode or diodes 64 are electrically coupled to the center conductor of the coplanar transmission structure 66 that extend from the end face 62 of the electrical element 56. The sampling diode or diodes 64 are electrically coupled to a conductive contact pad 90 formed on the top surface 58 of the electrical element 56 at the opposite end of the electrical element 56. The substantially flat electrical conductor 68 couples the sampled electrical signal from the sampling diode or diodes 56 to the additional circuitry formed on an adjacent substrate 70. Such circuitry may include amplifiers, summing circuits and the like. Electrical leads (not shown) couple electrical power and biasing voltages to the electrical element 56. As was described for the opto-electronic element 24, the electrical element 56 may be formed on one of the horizontal surfaces 58 and the coplanar transmission structure 66 may be formed on the opposing horizontal surface 58. Electrically conductive vias couple the electrical output of the electrical device 64 to the coplanar transmission structure 66.

Referring to FIG. 3, there is illustrated an alternative embodiment of the securing member 78 in the housing 40 and tine 80 on the carrier 16. The tine 80 is formed on the bottom surface 26 of the carrier 16. Preferably, the tine 80 is positioned toward the center of the bottom surface 80. The securing member 78 in the upper portion 76 of the strut 74 is an axially formed bore 96 extending from the top 98 of the strut 74. The diameter of the bore 98 is larger than the diameter of the tine 80 to allow linear and rotational positioning of the carrier 16 and/or the housing 40 in three mutually perpendicular planes to position the coplanar transmission structures 34 and 66 on the opto-electrical and electrical elements in a proximate abutting relationship.

The carrier 16 and the housing 40 are position in an alignment mount with at least one of the carrier and housing being linearly and rotationally moveable in the three mutually perpendicular directions relative to the other. The carrier 16 and the housing 40 are positioned to align the coplanar transmission structures 34 and 66 in a proximate abutting relationship. The lateral separation of the coplanar transmission structures 34 and 66 is in the sub-millimeter range with the preferred lateral separations being as small as possible. The coplanar transmission structures 34 and 66 are aligned such that the end faces of the opto-electronic and electrical elements 30 and 56 are parallel to each other and the coplanar transmission structures 34 and 66 lay in the same plane. Once the coplanar transmission structures 34 and 66 are aligned in the abutting relationship, the carrier 16 and housing 40 are joined together by bonding the tines on the carrier 16 with the securing members 78 on the struts 74. The bonding material may include a low temperature solder, an adhesive, such as an epoxy, UV cured epoxy or a low melting temperature metal with strong adhesion, such as indium. The coplanar transmission structures 34 and 66 are then electrically coupled together using substantially flat electrical conductors 92, such as wedge bonded gold ribbon wire, bond wires or the like.

Figure 4D:
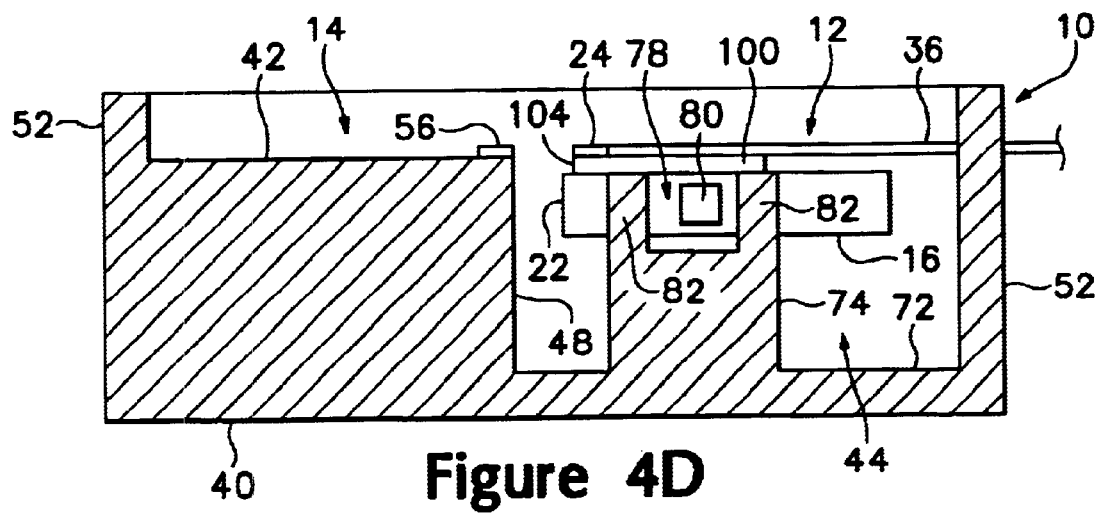

FIGS. 4A through 4L illustrate various positioning configurations for the opto-electrical and electrical elements 24 and 56 in the opto-electronic module 10 of the present invention. Like elements of the previous drawing figures are labeled the same in FIGS. 4A through 4L. FIG. 4A shows the opto-electrical element 24 recessed back from the open end face 22 of the carrier 16 and the electrical element 56 is recessed back from the open end face 48 in the housing 40. The total setback of the elements 24 and 56, that is the combined setback of both elements, is less than one millimeter. For example, the opto-electrical element 24 may be setback 900 microns from the open end face 22 and the electrical element 56 setback 90 microns from the open end face 48. FIG. 4B illustrates the opto-electrical and electrical elements 24 and 56 extending to the open end faces 22 and 48 of their respective carrier 16 and housing 40. FIG. 4C illustrates the opto-electrical and electrical elements 24 and 56 extending past the open end faces 22 and 46 of their respective carrier 16 and housing 40. Any combination of these opto-electrical and electrical element positions are possible. For example, the opto-element 24 may be recessed on the carrier 16 and the electrical element 56 extends to or past the open end face 48 in the housing 40 or the electrical element 56 extends to the open end face 48 in the housing 40 and the opto-electrical element 24 extends past the open end face 22 of the carrier 16.

Figure 4E:
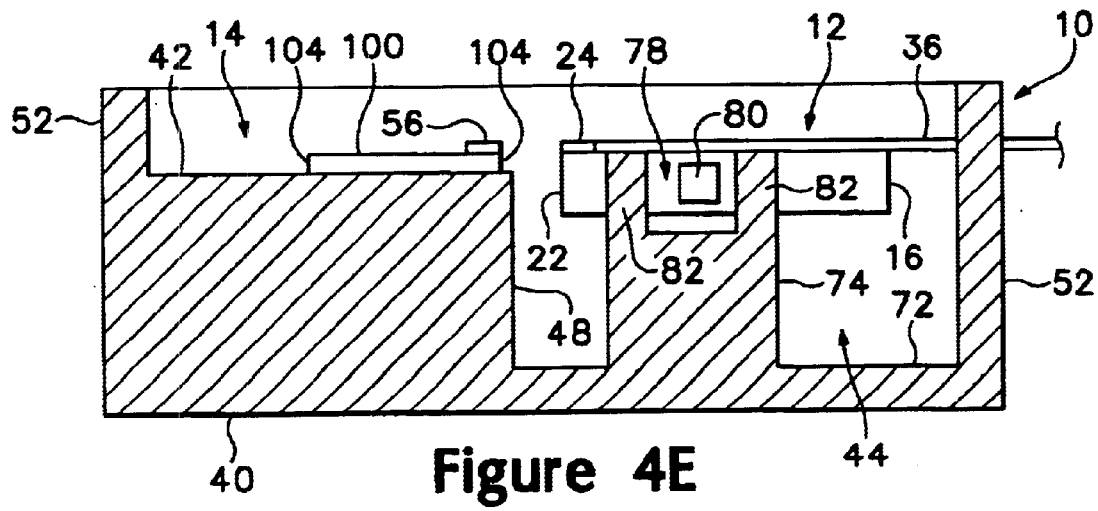
Figure 4F:
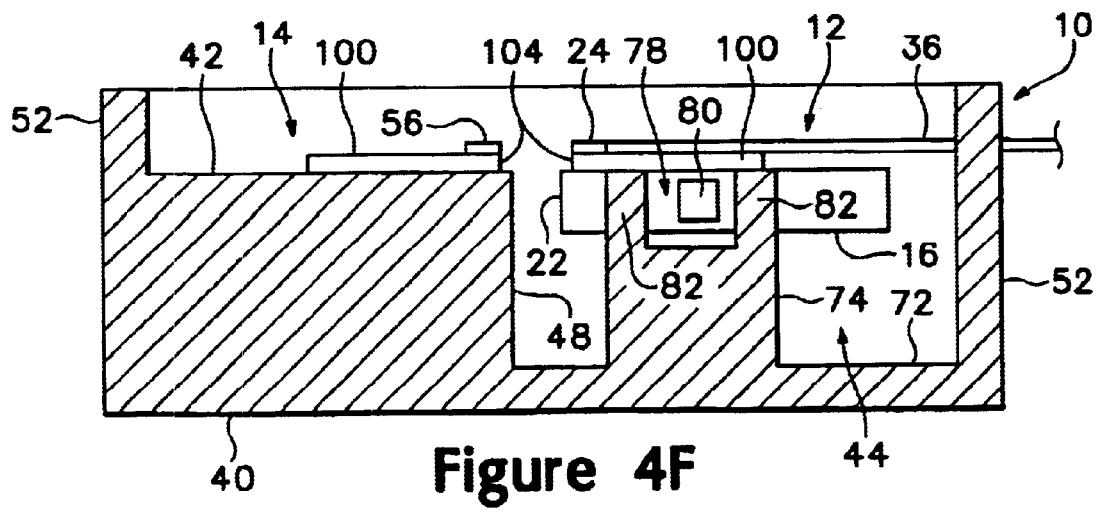

Each opto-electrical and electrical section 12 and 14 may be provided with a mounting dielectric substrate 100. The mounting dielectric substrate has opposing horizontal surfaces 102 and an end face 104 and may be formed of an alumina-oxide material or similar non-conducting material. FIG. 4D illustrates the positioning of a mounting dielectric substrate 100 on the carrier 16 of the opto-electrical section 12 with the opto-electrical element 24 positioned on the mounting dielectric substrate 100. The mounting dielectric substrate 100 is shown recessed from the open end face 22 of the carrier 16 with the opto-electrical element 24 extending to the end face 104 of the mounting dielectric substrate 100. The electrical element 56 is positioned in the shallow cavity 42 of the housing 40 with the electrical element 56 extending to the open end face 48 in the housing 40. FIG. 4E illustrates the positioning of the mounting dielectric substrate 100 in the shallow cavity 42 of the housing 40 with the electrical element 56 positioned on the mounting dielectric substrate 100. The mounting dielectric substrate 100 is shown recessed from the open end face 48 of the housing 40 with the electrical element 56 extending to the end face 104 of the mounting dielectric substrate 100. The opto-electrical element 24 is positioned on the carrier 16 of the opto-electrical section 12 with the opto-electrical element 24 extending to the open end face 22 of the carrier 16. FIG. 4F illustrates the positioning of mounting dielectric substrates on each of the opto-electrical and electrical sections 12 and 14. Each substrate is shown recessed from the respective open end faces 22 and 48 of their respective carrier 16 and housing 40. The opto-electrical and electrical elements 24 and 56 are positioned on the mounting dielectric substrates 100 with the opto-electrical and electrical elements 24 and 48 extending to the end faces 104 of the respective mounting dielectric substrates 100.

Figure 4G:
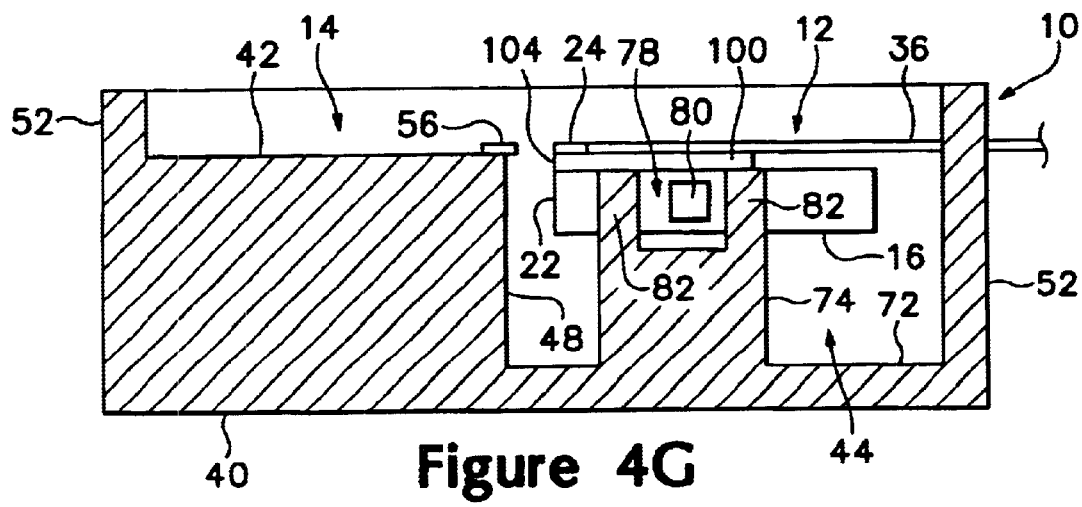
Figure 4H:
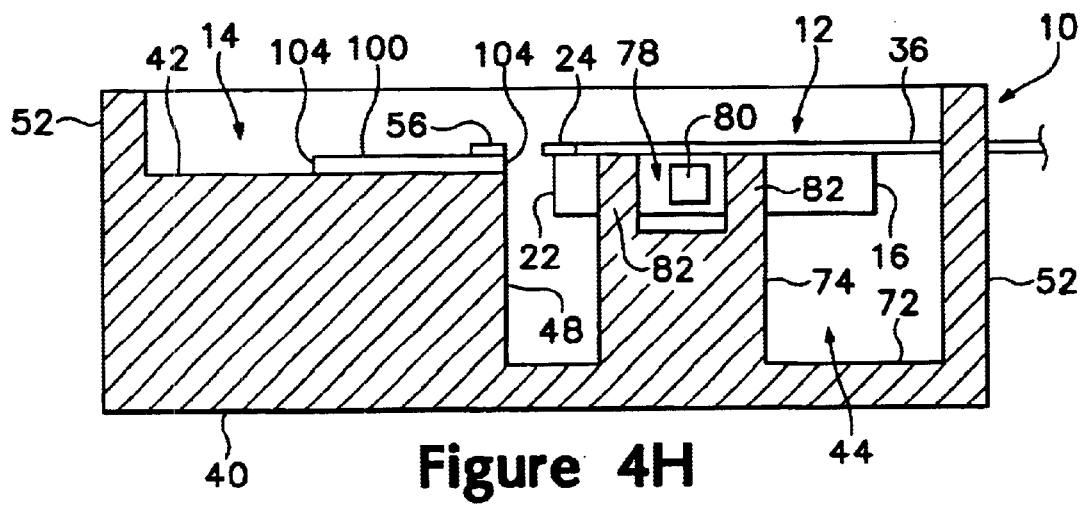
Figure 4I:
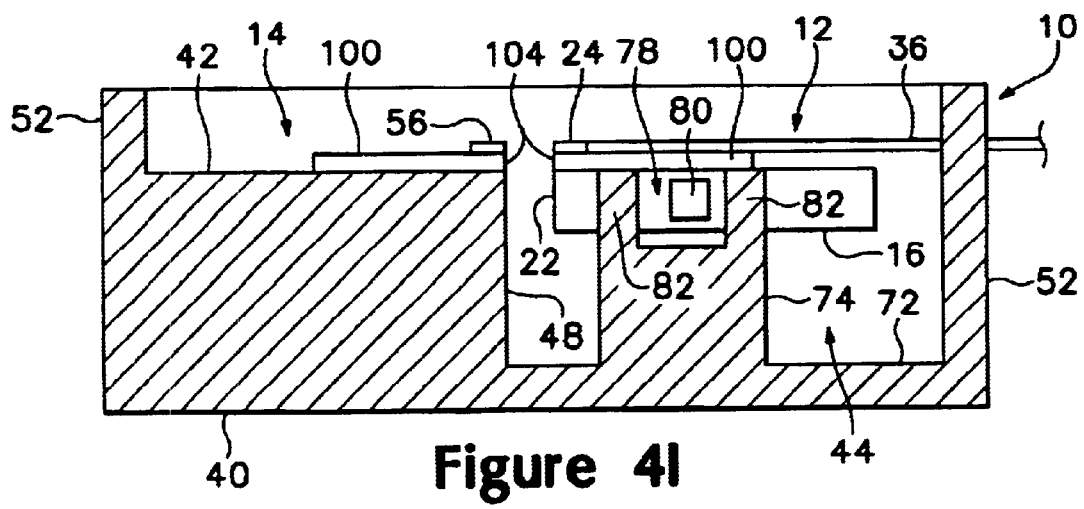

FIG. 4G illustrates the positioning of the mounting dielectric substrate 100 on the carrier 16 with the mounting dielectric substrate extending to the open end face 22 of the carrier 16. The opto-electrical element 24 is positioned on the mounting dielectric substrate 100 with the opto-electrical element 24 extending to the end face 104 of the dielectric substrates 100. The electrical element 56 is positioned in the shallow cavity 42 and extend past the open end face 48 in the housing 40. FIG. 4H illustrates the positioning of the mounting dielectric substrate 100 in the shallow cavity 42 in the housing 40 with the mounting dielectric substrate extending to the open end face 48 in the housing 40. The electrical element 56 is positioned on the mounting dielectric substrate 100 with the electrical element 56 extending to the end face 104 of the dielectric substrates 100. The opto-electrical element 24 is positioned on the carrier 16 and extend past the open end face 22 of the carrier. FIG. 4I illustrates mounting dielectric substrates 100 mounted on the carrier 16 and in the shallow cavity 42 of the housing 40 of the opto-electrical and electrical sections 12 and 14. The end faces 104 of the mounting dielectric substrates 100 extend to the open end faces 22 and 48 of the carrier 16 and housing 40. The opto-electrical and electrical elements 24 and 56 positioned on the mounting dielectric substrates 100 extend to the end faces 104 of the mounting dielectric substrate 100.

Figure 4J:
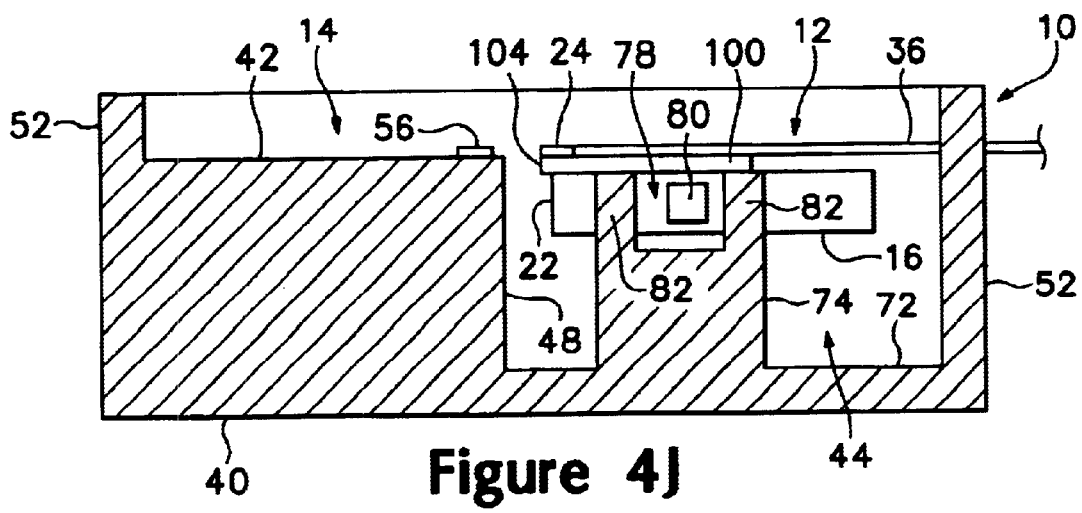
Figure 4K:
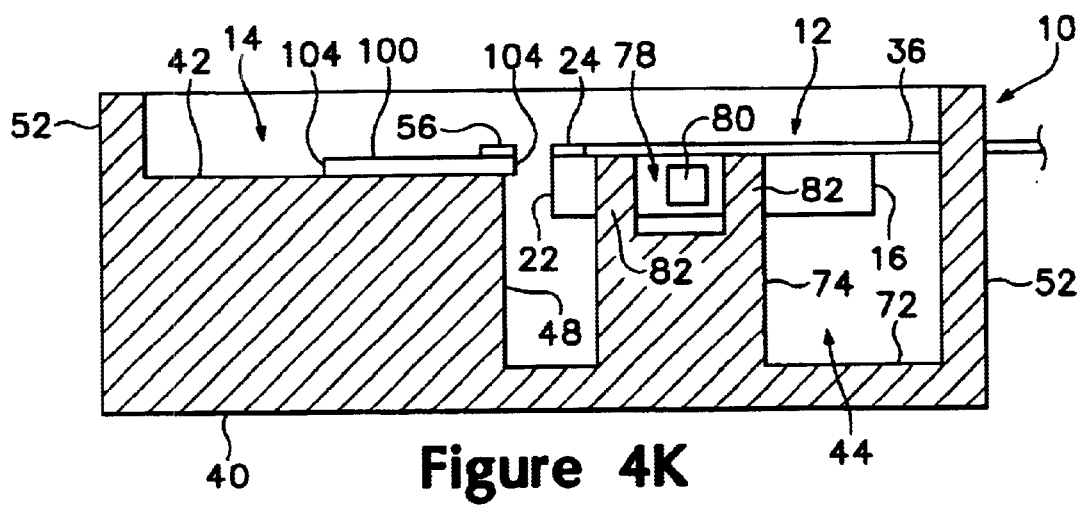
Figure 4L:
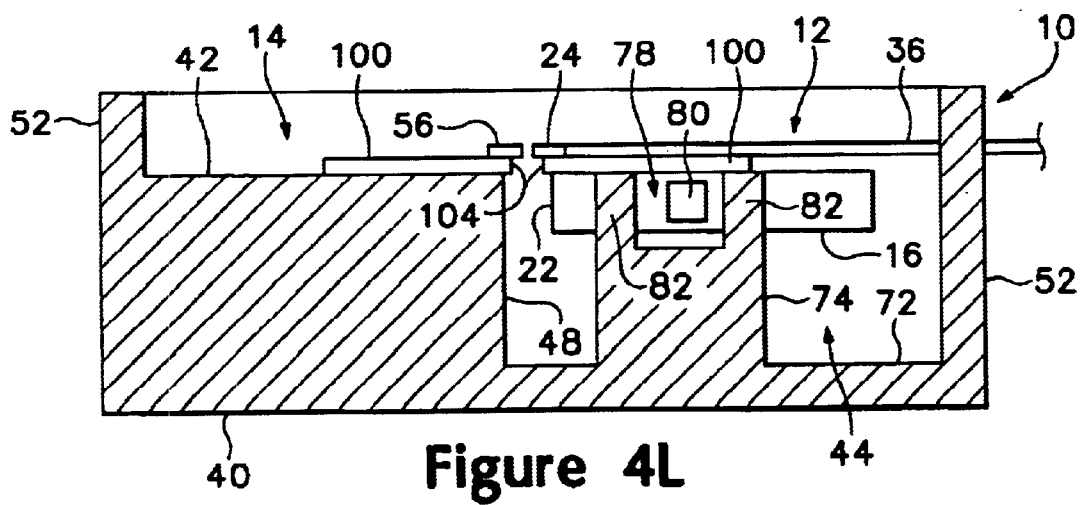

FIG. 4J illustrate the positioning of the mounting dielectric substrate 100 on the carrier 16 with the mounting dielectric substrate extending past the open end face 22 of the carrier 16. The opto-electrical element 24 is positioned on mounting dielectric substrate 100 with the opto-electrical element 24 extending to the end face 104 of the dielectric substrate 100. The electrical element 56 is positioned in the shallow cavity 42 away from the open end face 48 in the housing 40. FIG. 4K illustrate the positioning of the mounting dielectric substrate 100 in the shallow cavity 42 with the mounting dielectric substrate extending past the open end face 48 in the housing 40. The electrical element 56 is positioned on mounting dielectric substrate 100 with the electrical element 56 extending to the end face 104 of the dielectric substrate 100. The opto-electrical element 24 is positioned on the carrier 16 with the opto-electrical element 24 extending to the open end face 22 of the carrier 24. FIG. 4L illustrates the mounting dielectric substrates 100 mounted on the carrier 16 and in the shallow cavity 42 of the housing. The end faces 104 of the mounting dielectric substrates 100 extend past the open end faces 22 and 48 of the carrier 16 and housing 40. The opto-electrical and electrical elements 24 and 56 positioned on the mounting dielectric substrates 100 extend past the end faces 104 of the mounting dielectric substrates 100.

The above illustrated examples of the positioning of the opto-electrical and electrical elements 24 and 56 on the carrier 16 and in the shallow cavity 42 of the housing 40 and the positioning of one or more mounting dielectric substrates 100 on the carrier 16 and in the shallow cavity 42 and the positioning of the opto-electrical and electrical elements 24 and 56 on the mounting dielectric substrates 100 represent some but not all of the possible positioning configuration for the opto-electronic module 10. Each of the positioning locations for the opto-electrical and electrical elements 24 and 56 on the carrier 16 and in the shallow cavity 42 may equally be used in positioning the elements 24 and 56 on the mounting dielectric substrate 100. Each of the positioning locations of the mounting dielectric substrate 100 may be used in conjunction with each opto-electrical and electrical section 12 and 14 or with both of the sections 12 and 14.

The opto-electronic module 10 has been described with the opto-electrical and electrical elements 24 and 56 positioned on the carrier 16 and in the shallow cavity 42 of the housing 40. The opto-electrical and electrical elements 24 and 56 are disposed adjacent to the open end faces 22 and 48 of the carrier 16 and the housing 40 such that the end faces 30 and 62 of the opto-electrical and electrical elements 24 and 56 have a sub-millimeter lateral separation. Preferably the lateral separation is kept as small as possible to minimize the inductive and capacitive effects of the substantially flat electrical conductors 92 connecting the coplanar transmission structures 34 and 66. However, additional inductance may be needed to compensate for electrical characteristics of the opto-electrical and electrical elements 24 and 56. In this instance, the separation between the coplanar transmission line structures 34 and 66 may be increased to increase the length of the connecting electrical conductors 92.

Figure 5:
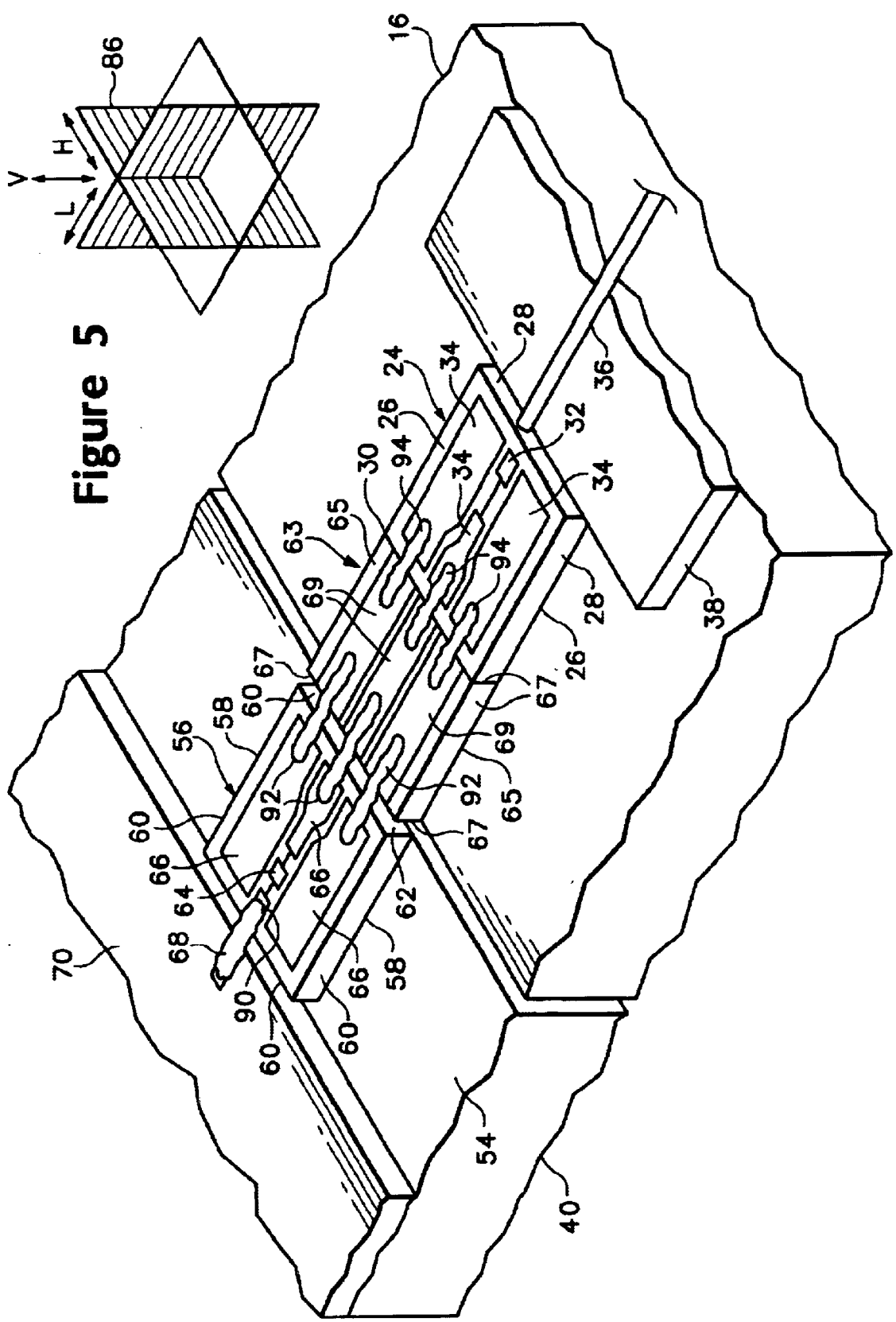
FIG. 5 is a detailed perspective view of a standoff dielectric substrate abutting one of the optical and electrical elements of the butt joined opto-electronic module according to the present invention.

The coplanar transmission structures 34 and 66 are preferably impedance and dimensionally matched in a 50 ohm environment. However, the use of different substrate materials for the opto-electrical and electrical elements 24 and 56 may result in 50 ohm coplanar transmission lines of differing dimensions on one of the opto-electrical or electrical elements 24 and 56. Further, the patterned coplanar transmission structures 34 and 66 formed on the opto-electrical and electrical elements 24 and 56 are formed of thin layers of gold over an adhesion material, such as titanium and/or platinum plating. Excessive probing or wire or wedge bonding to the coplanar transmission structures 34 and 66 will remove portions of the gold layer destroying the electrical connectivity of the transmission structure. The flexibility and robustness of the opto-electronic module 10 may be increased by adding one or more standoff dielectric substrates 63. The standoff dielectric substrate 63 (as best shown in FIG. 5) has opposing horizontal surfaces 65 and opposing vertical end walls 67 with a coplanar transmission structure 69 formed on one of the horizontal surfaces. The standoff dielectric substrate 63 is formed of a dielectric material, such as aluminum oxide or the like, with the coplanar elements of the coplanar transmission structure 69 extending to the end walls 67 of the substrate 63. This structure is in contrast to current standoff dielectric substrates where the coplanar transmission structure does not extend to the end walls of the substrate. This is due to the method of manufacturing the standoff dielectric substrates. The traditional method of manufacturing standoff dielectric substrates is to lay down multiple coplanar transmission structures on the dielectric substrate. The dielectric substrate is then laser scribed and the individual standoff dielectric substrates are snapped off from the larger dielectric substrate. The resulting standoff dielectric substrate has vertically jagged end walls due to the snapping off process.

Extending the coplanar elements of the coplanar transmission structure 69 to the end walls 67 of the standoff dielectric substrate 63 decreases the separation between the coplanar transmission structures 34 and 66 on opto-electrical and electrical elements 24 and 56 and the coplanar transmission structure 69 on the standoff dielectric substrate 63. The process for producing a standoff dielectric substrate 63 with a coplanar transmission structure 69 extending to the end walls 67 of the substrate requires the use of low temperature soluble wax to protect the coplanar transmission structure during processing. A number of coplanar waveguide structures 69 are formed on a wafer of dielectric material using a thin layer of gold. The low temperature water soluble wax, such as Crystal Bond or the like, is placed over the coplanar transmission structures 69 to protect the structures during manufacture. Tape is placed over the wax to prevent the wax from being washed off during processing and to prevent the standoff dielectric substrates 63 from being lost during processing. The wafer of dielectric material is then sawn on a line that intersects the coplanar elements of the coplanar transmission line structures 69. A coolant, such as a water jet, is applied to the wafer during the sawing process to prevent heat buildup. The wax is used to prevent the coplanar transmission structures 69 from lifting off the wafer during the sawing process. The tape prevent the protects the water soluble wax from being removed by the water jet. After the end walls 67 of each of the standoff dielectric substrates 63 are cut, the tape is removed and the water soluble wax is washed off the finished substrates 63. The standoff dielectric substrate 63 is positioned on the carrier 16 and/or in the shallow cavity 42 of the housing 40 in an abutting relationship with the opto-electrical or electrical elements 24 and 56 and secured using an adhesive, such as a conductive or non-conductive epoxy.

In an alternate cutting process, the standoff dielectric substrate 63 may be cut in situ on the carrier 16. The standoff dielectric substrate 63 is formed using the above described process with the initial length of the substrate 63 being longer than needed. The standoff dielectric substrate 63 is mounted on the carrier 16 abutting the end face 22. The water soluble wax is applied to the standoff dielectric substrate 63 and the tape is applied over the wax. The standoff dielectric substrate 63 and the carrier 16 are then sawn together with the result being the standoff dielectric substrate 63 abutting the end face 22 of the carrier 16.

The inductance of the coplanar transmission structure 69 should match the inductance of the coplanar transmission structures 34 and 66. Where the coplanar transmission structures 34 and 66 are dimensionally matched, as in FIG. 5, the coplanar elements of the coplanar transmission structure 69 of the standoff dielectric substrate 63 has the same dimensions across the substrate. Where the coplanar transmission structures 34 and 58 are dimensionally mismatched, the dimensions of the coplanar elements of the coplanar transmission structure 69 of the standoff dielectric substrate 63 transition across the substrate from the dimension of the one coplanar transmission structure to the dimension of the other coplanar transmission structure while maintaining the characteristic impedance from one coplanar transmission structure to the other. As illustrated in FIG. 5, the standoff dielectric substrate 63 is positioned on the carrier 16 of the opto-electrical section 12 in an abutting relationship with the opto-electrical element 24. The end face 30 of the opto-electrical element 24 is butted against one of the end walls 67 of the standoff dielectric substrate 63 terminating the coplanar transmission structure 69. The coplanar transmission structures 34 and 69 vertically coplanar. The other end wall 67 terminating the coplanar transmission structure 69 is positioned adjacent to the open end face 22 of the carrier 16 to provide micron separation between the coplanar transmission structures 69 and 58. The coplanar transmission structure 34 on the opto-electrical element 24 and the coplanar transmission structure 69 on the standoff dielectric substrate 63 are electrically coupled together using substantially flat electrical conductors 94, such as wedge bonded gold ribbon wire, bond wires or the like. The standoff dielectric substrate 63 may also be positioned in the shallow cavity 42 of the electrical section 14 in an abutting relationship with the electrical element 56 or each of the opto-electrical and electrical elements 24 and 56 may have an abutting standoff dielectric substrate 63 as best illustrated in FIGS. 7A–7X.

FIG. 6 is a closeup perspective view of the butt joined interface between the carrier 16 and the shallow cavity 42 of the housing 40 and the coplanar transmission structures 34, 66 and 69 where the coplanar transmission structures 34 and 66 are dimensionally mismatched. Like elements from the previous drawings are labeled the same in FIG. 6. The coplanar transmission structure 69 at the opposing end walls 67 of the standoff dielectric substrate 63 matches the dimensions of the coplanar transmission structures 34 and 66 formed on the opto-electrical and electrical elements 24 and 56. Between the opposing end walls 67, each of the planar elements of the coplanar transmission structure 69 dimensionally transitions from one coplanar transmission structure dimension to the other coplanar transmission structure dimension. Different dimensioned electrical conductors 92 corresponding to the dimensions of the different sized coplanar transmission structures electrically coupled the coplanar transmission structures together.

Figure 7A:
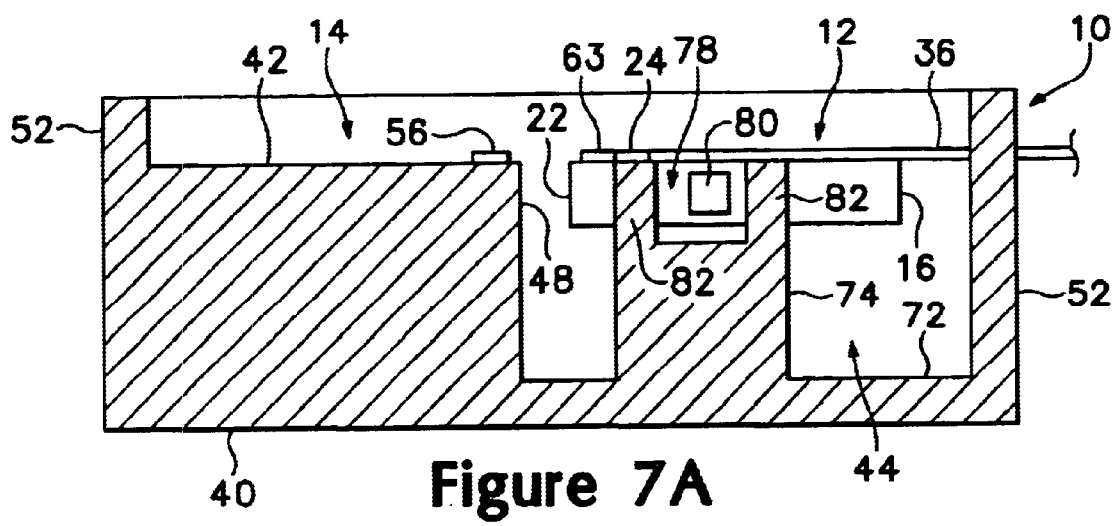
FIGS. 7A–7X are side views of various configurations of the standoff dielectric substrate or substrates with the optical and electrical elements in the butt joined opto-electronic module according to the present invention.
Figure 7B:
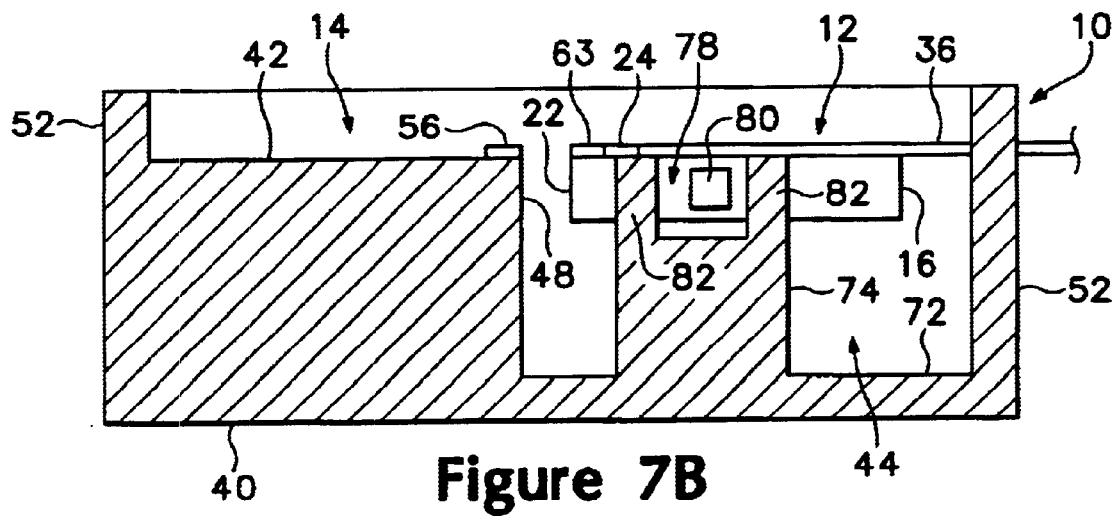
Figure 7C:
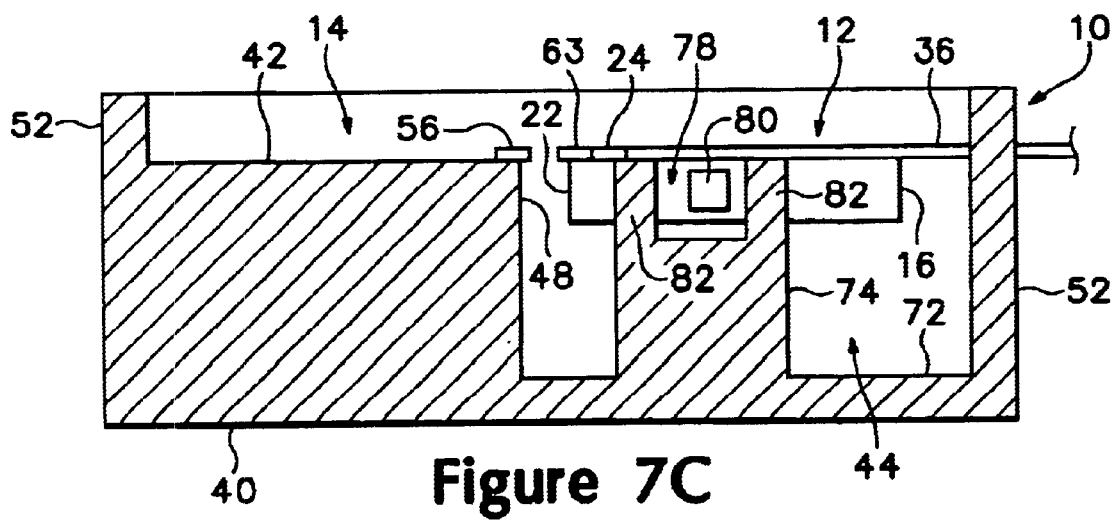
Figure 7D:
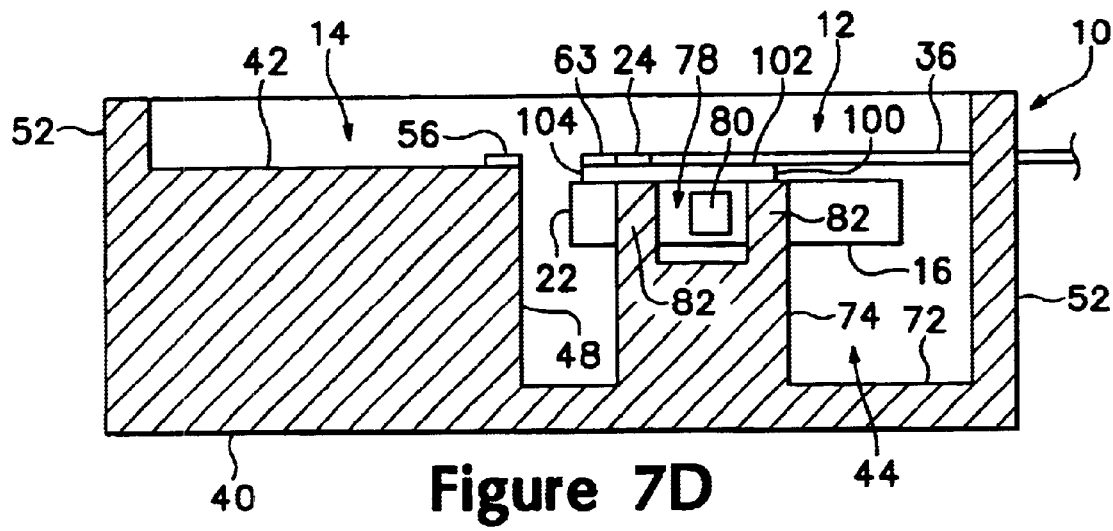
Figure 7E:
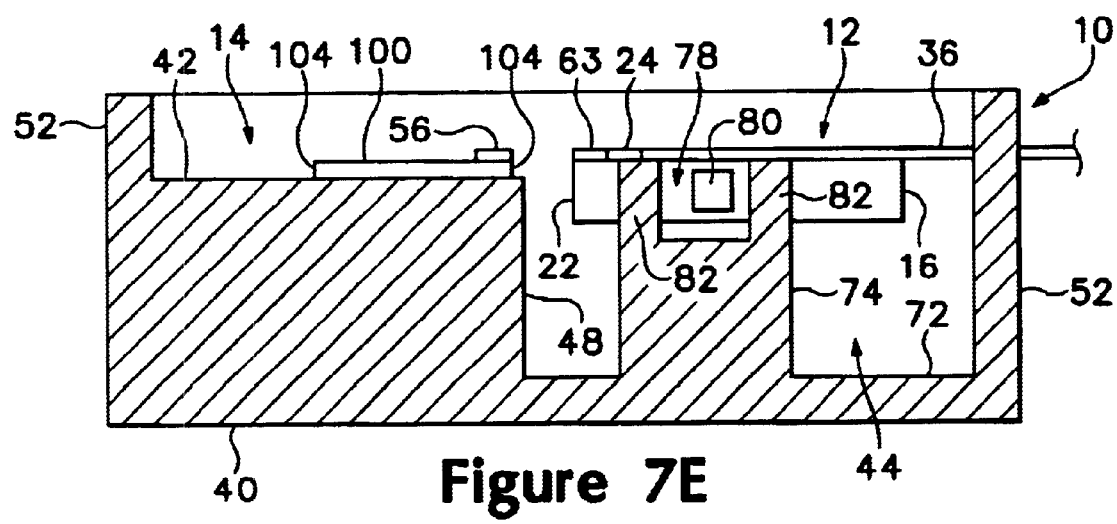
Figure 7F:
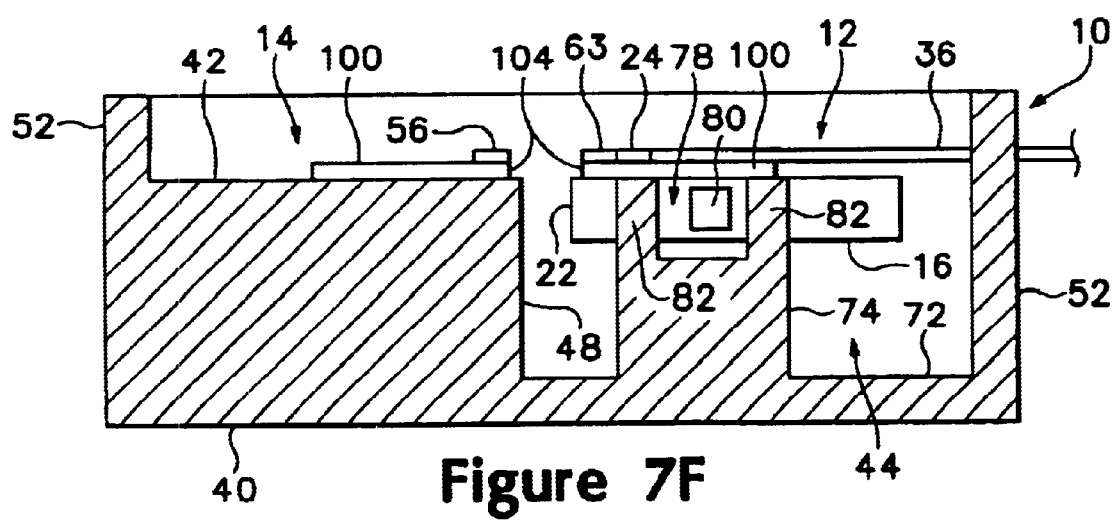
Figure 7G:
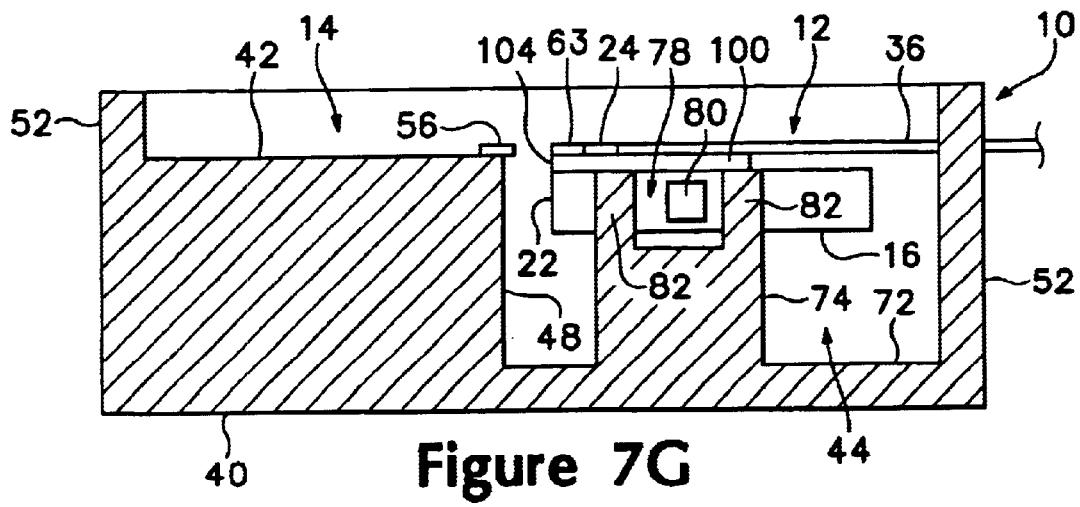
Figure 7H:
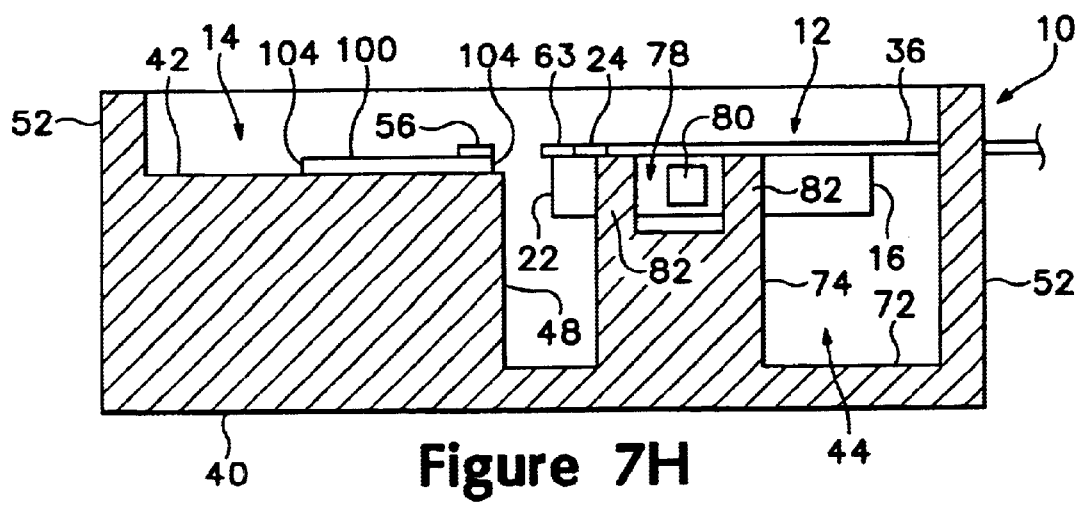
Figure 7I:
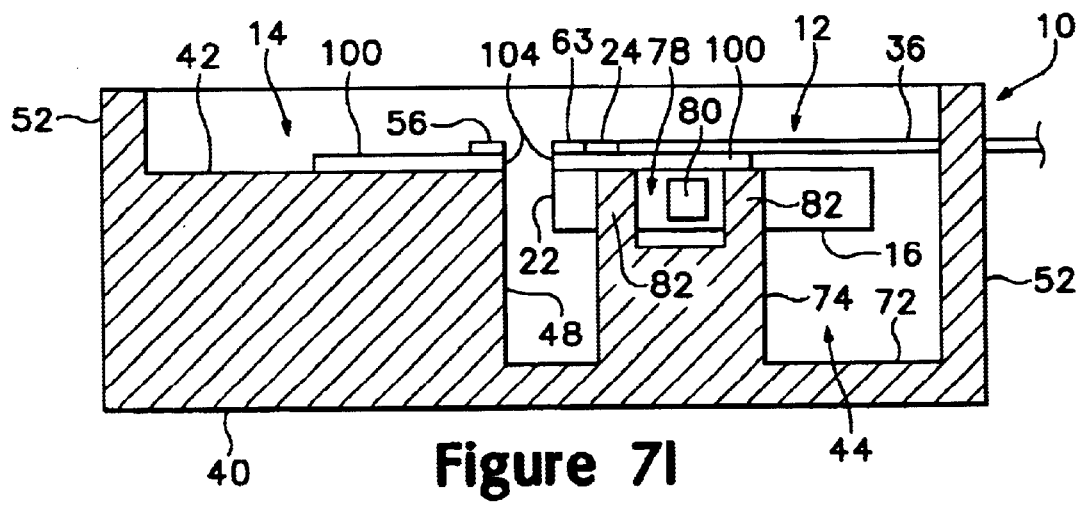
Figure 7J:
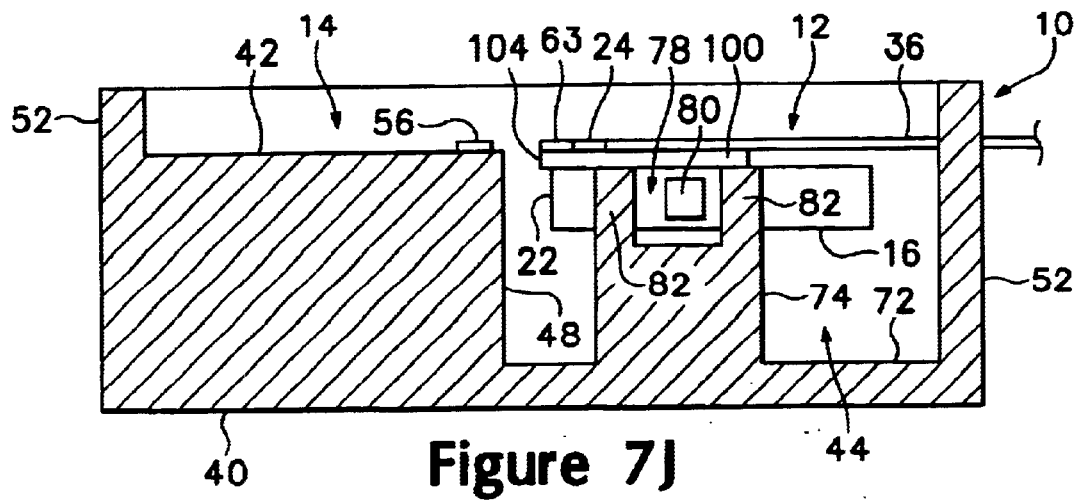
Figure 7K:
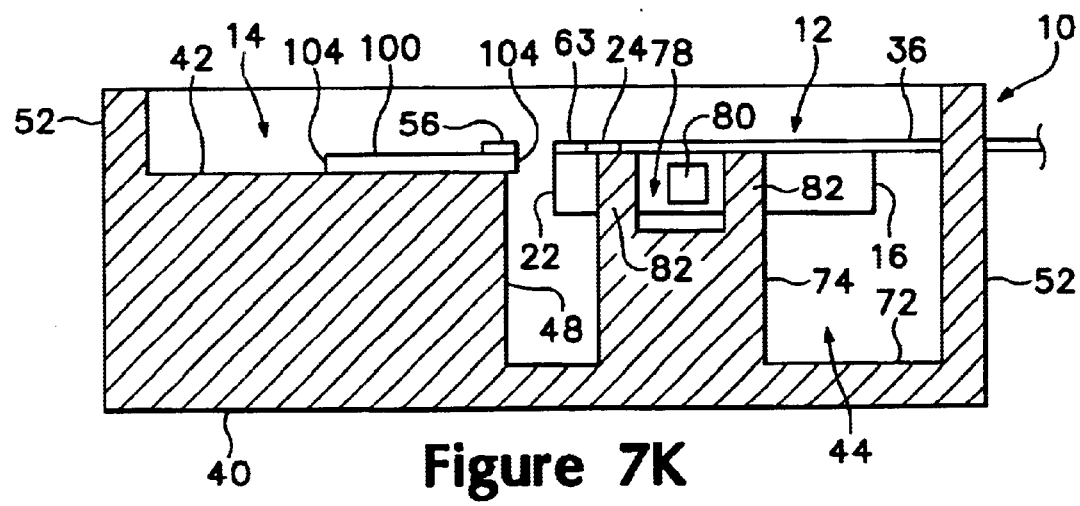
Figure 7L:
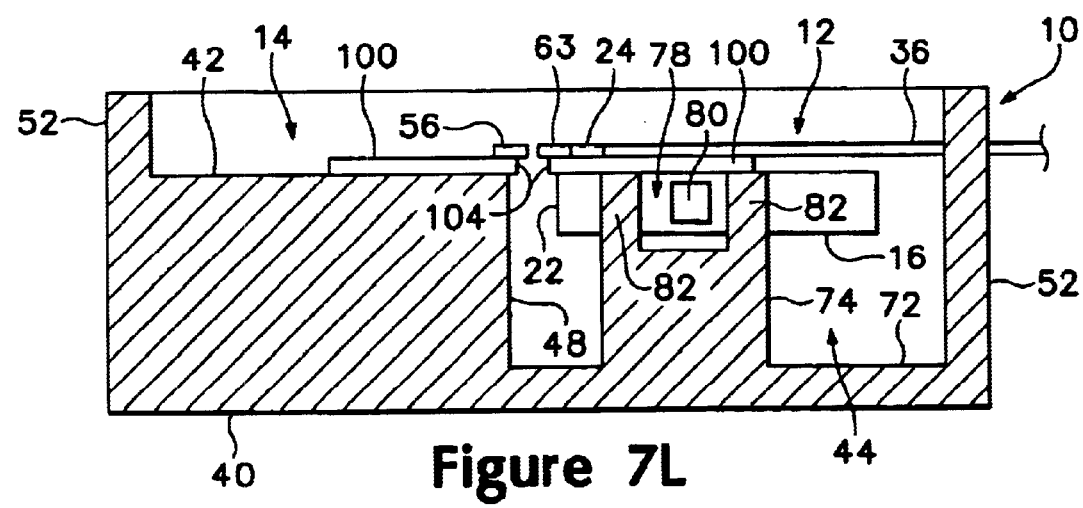
Figure 7M:
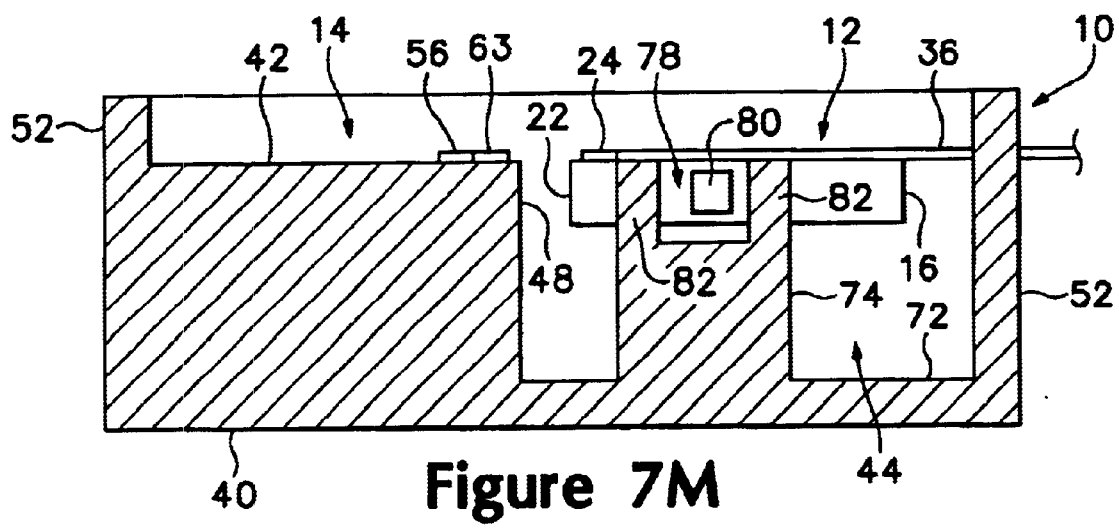
Figure 7N:
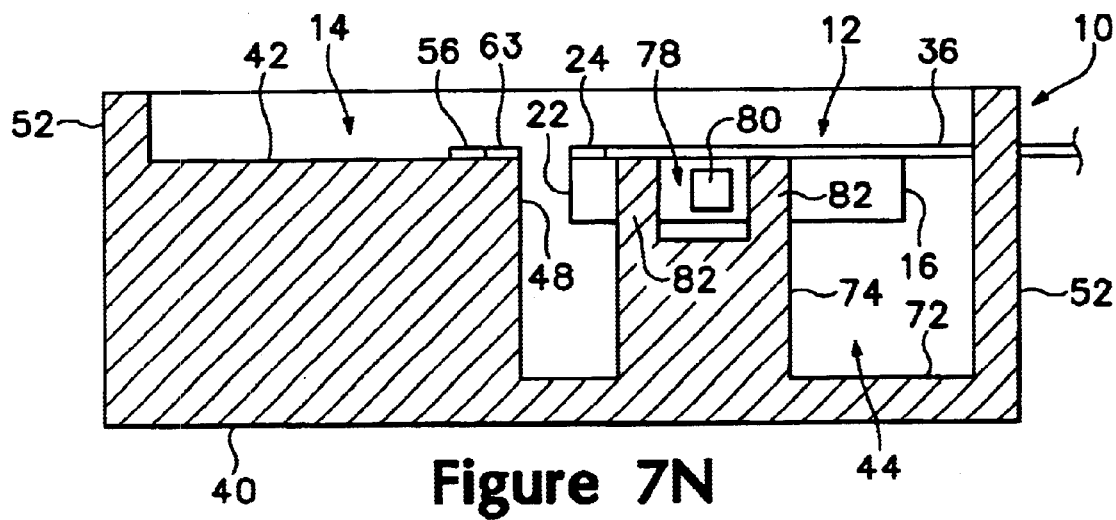
Figure 7O:
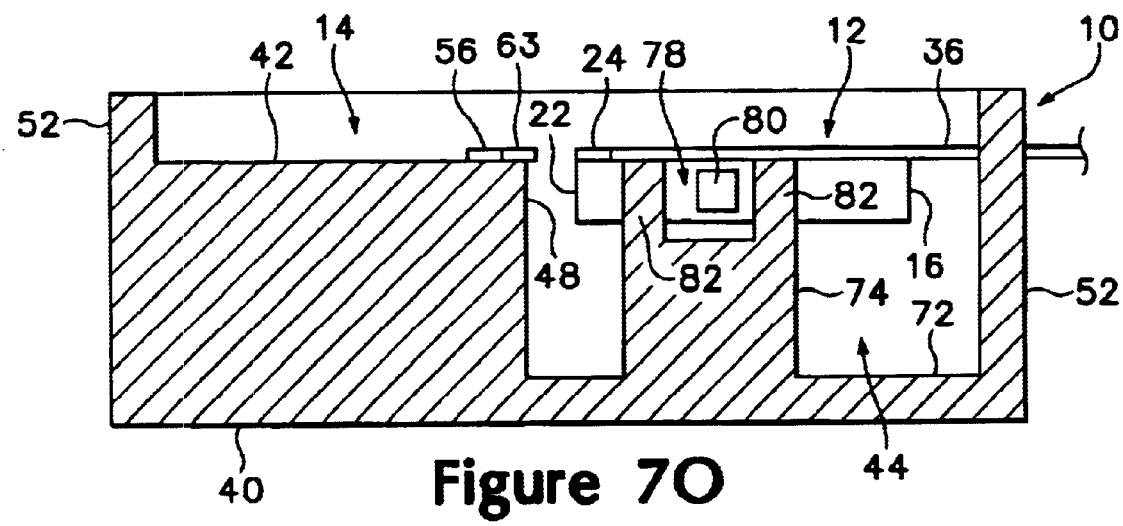
Figure 7P:
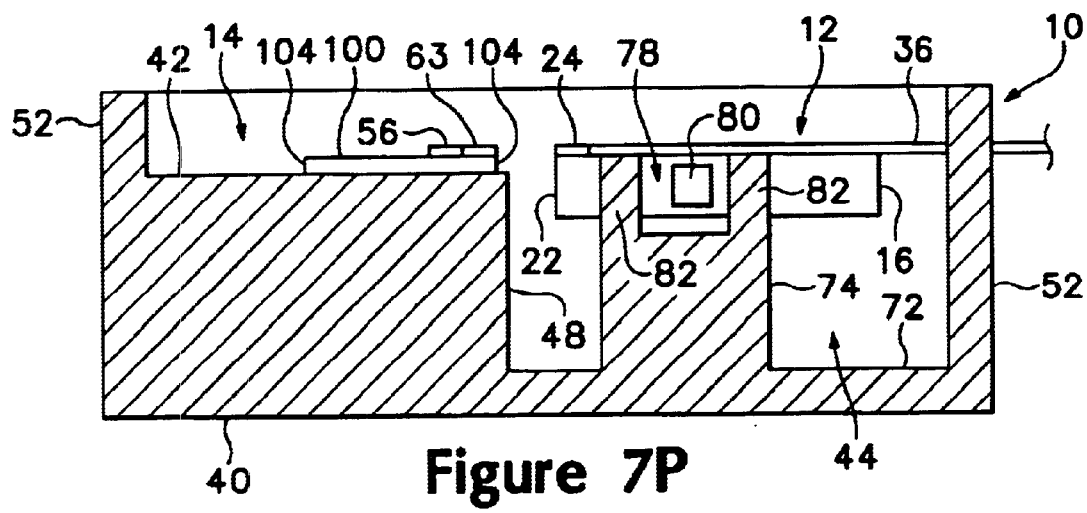
Figure 7Q:
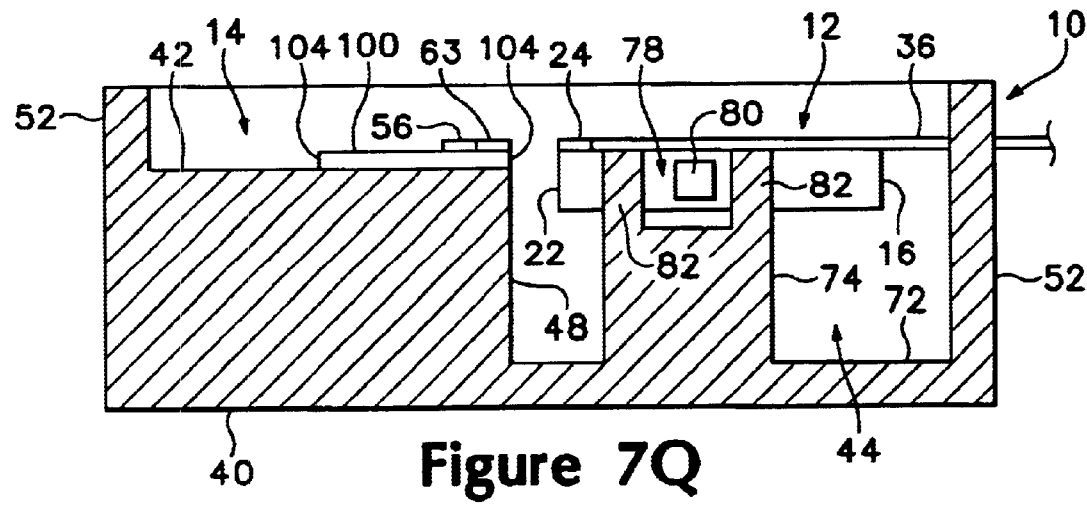
Figure 7R:
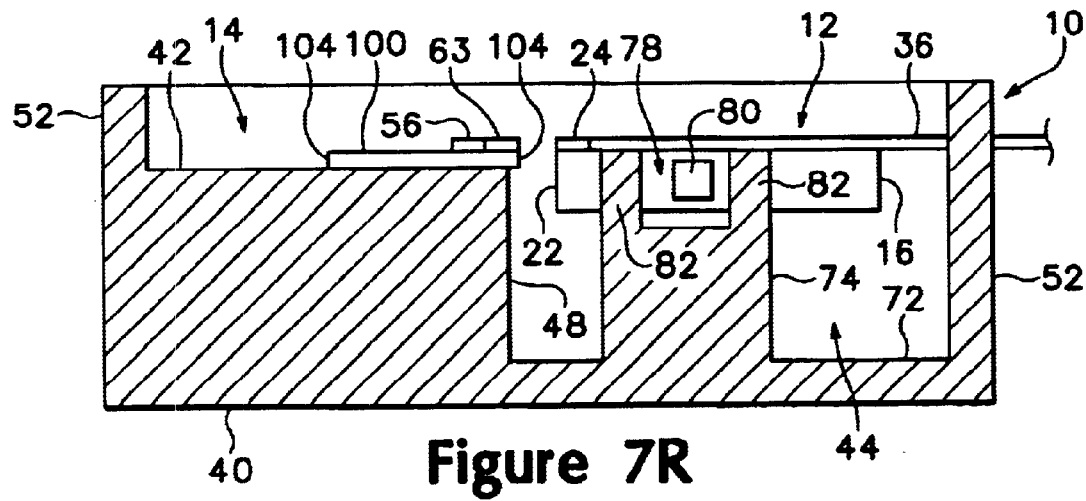
Figure 7S:
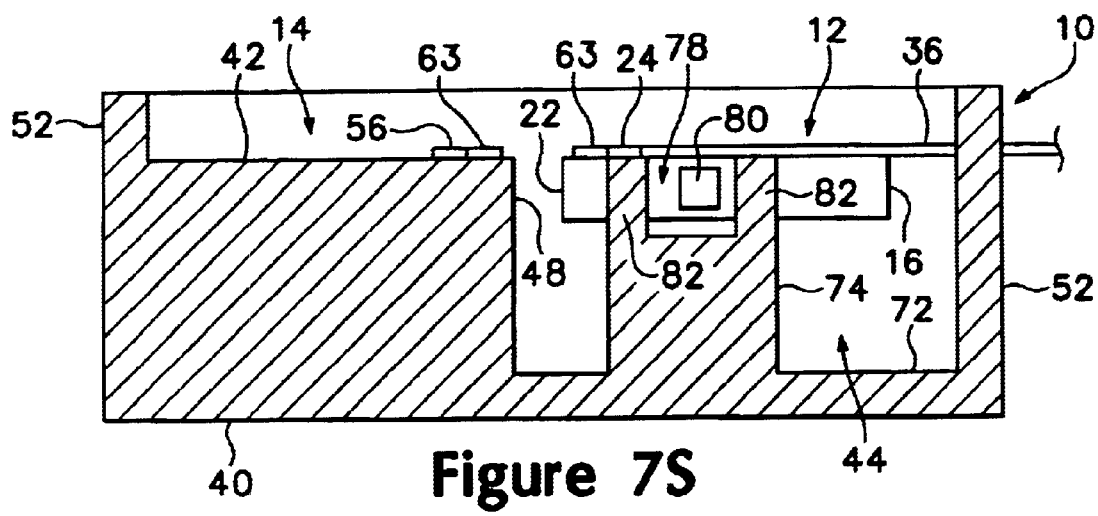
Figure 7T:
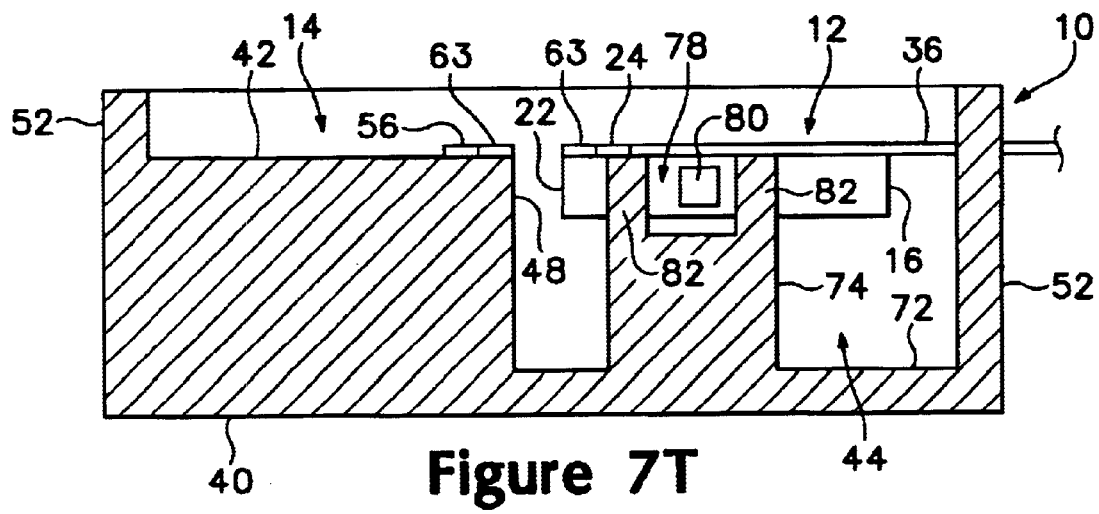
Figure 7U:
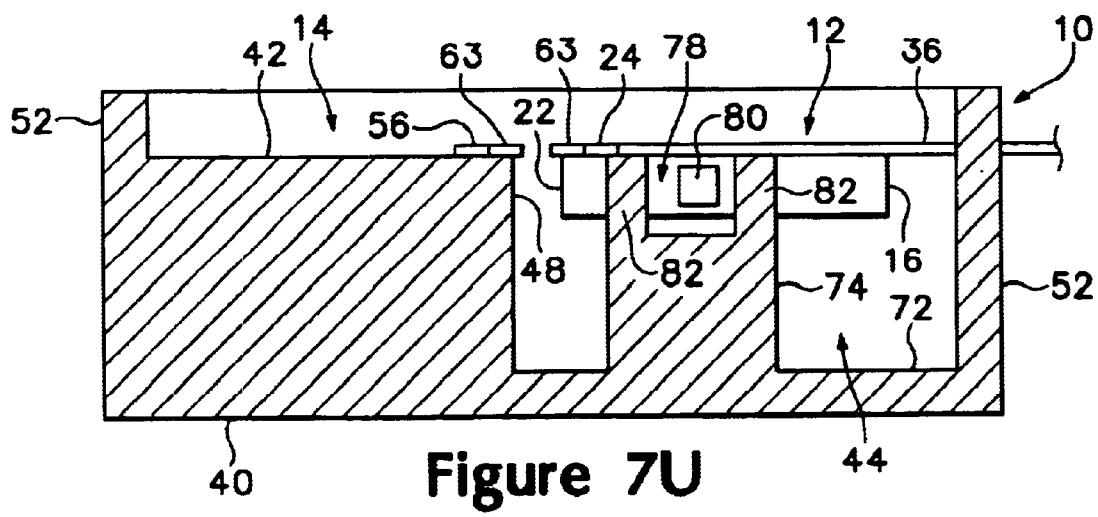
Figure 7V:
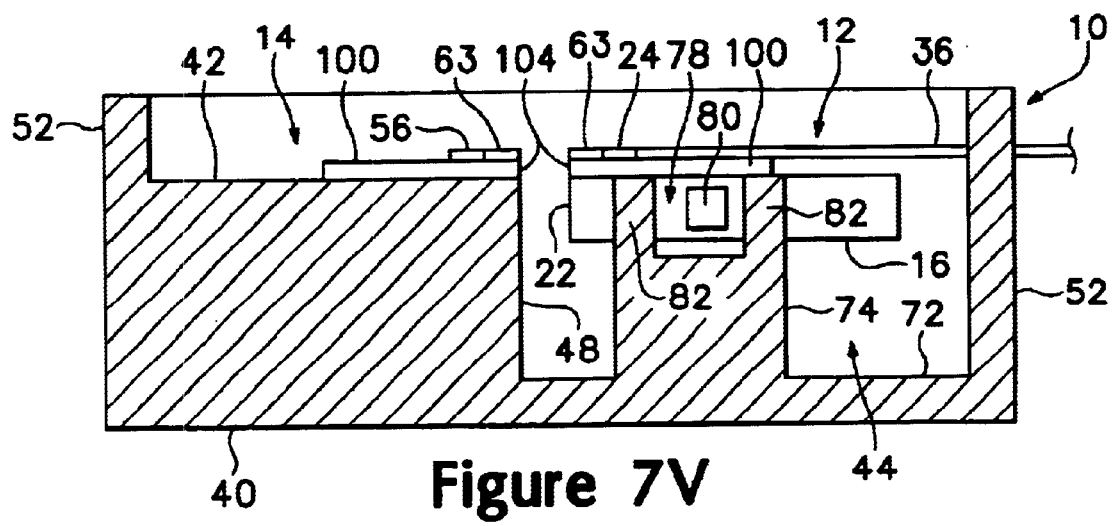
Figure 7W:
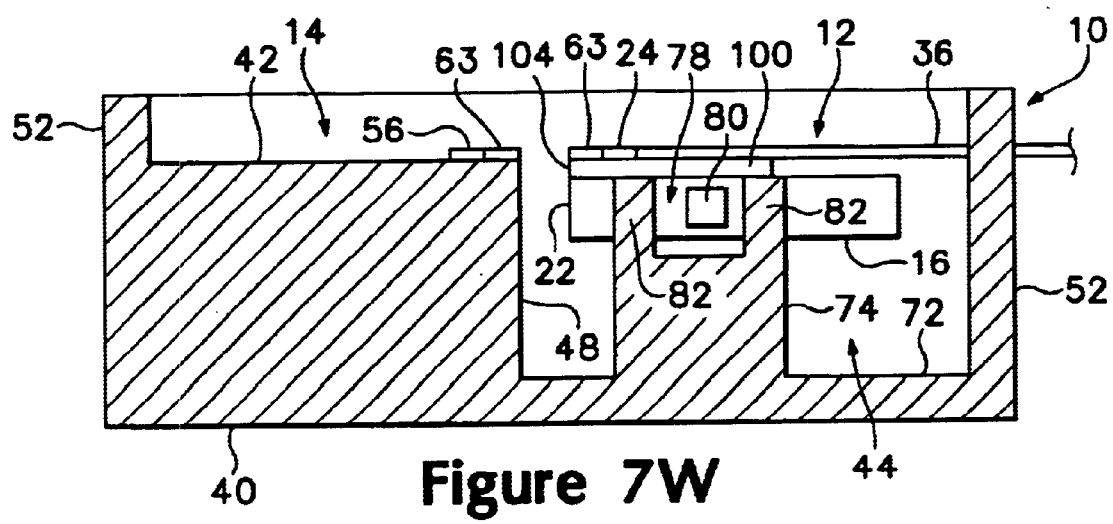
Figure 7X:
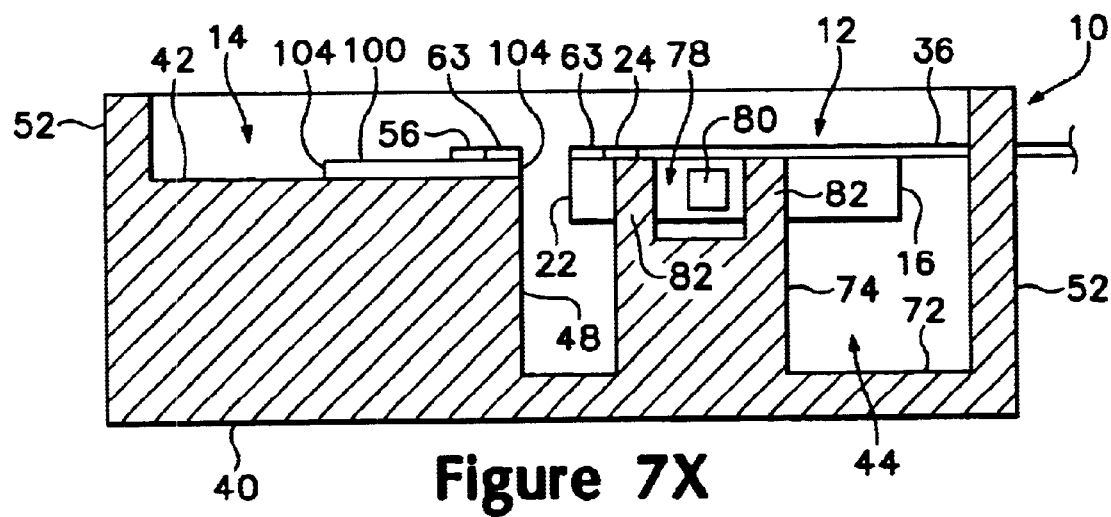

FIGS. 7A through 7X illustrate various positioning configurations for the standoff dielectric substrate or substrates 63 with the opto-electrical and electrical elements 24 and 56 in the opto-electronic module 10 of the present invention. Like elements of the previous drawing figures are labeled the same in FIGS. 7A through 7X. FIGS. 7A through 7L illustrate the standoff dielectric substrate 63 abutting the opto-electrical element 24, FIGS. 7M through 7R illustrate the standoff dielectric substrate abutting the electrical element 56 and FIGS. 7S through 7X illustrate separate standoff dielectric substrates abutting each of the opto-electrical and electrical elements 24 and 56. FIG. 7A shows the standoff dielectric substrate 63 abutting the opto-electrical element 24 and recessed back from the open end face 22 of the carrier 16 and the electrical element 56 recessed back from the open end face 48 of the housing 40. The total setback of the elements 63 and 56, that is the combined setback of both elements, is less than one millimeter. For example, the standoff dielectric substrate 63 may be setback 900 microns from the open end face 22 and the electrical element 56 setback 90 microns from the open end face 48. FIG. 7B illustrates the standoff dielectric substrate 63 and the electrical element 56 extending to the open end faces 22 and 48 of their respective carrier 16 and housing 40. FIG. 7C illustrates the standoff dielectric substrate 63 and the electrical element 56 extending past the open end faces 22 and 46 of their respective carrier 16 and housing 40. Any combination of these standoff dielectric substrate and electrical element positions are possible. For example, the standoff dielectric substrate may be recessed on the carrier and the electrical element extends to or past the open end face of the housing or the standoff dielectric substrate extends to the open end face of the carrier and the electrical element extends past the open end face of the housing.

Each opto-electrical and electrical section 12 and 14 may be provided with a mounting dielectric substrate 100. The mounting dielectric substrate has opposing horizontal surfaces 102 and an end face 104 and may be formed of a alumina-oxide material or similar non-conducting material. FIG. 7D illustrates the positioning of a mounting dielectric substrate 100 on the carrier 16 of the opto-electrical section 12 with the opto-electrical element 24 and the standoff dielectric substrate 63 positioned on the mounting dielectric substrate 100. The mounting dielectric substrate 100 is shown recessed from the open end face 22 of the carrier 16 with the standoff dielectric substrate 63 extending to the end face 104 of the mounting dielectric substrate 100. The electrical element 56 is positioned in the shallow cavity 42 of the housing 40 with the electrical element 56 extending to the open end face 48 of the housing 40. FIG. 7E illustrates the positioning of the mounting dielectric substrate 100 in the shallow cavity 42 of the electrical section 14 with the electrical element 56 positioned on the mounting dielectric substrate 100. The mounting dielectric substrate 100 is shown recessed from the open end face 48 of the housing 40 with the electrical element 56 extending to the end face 104 of the mounting dielectric substrate 100. The opto-electrical element 24 and the standoff dielectric substrate 63 are positioned on the carrier 16 of the opto-electrical section 12 with the standoff dielectric substrate 63 extending to the open end face 22 of the carrier 16. FIG. 7F illustrates the positioning of mounting dielectric substrates on each of the opto-electrical and electrical sections 12 and 14. Each substrate is shown recessed from the respective open end faces 22 and 48 of their respective carrier 16 and housing 40. The standoff dielectric substrate 63 and the opto-electrical element 24 are positioned on the standoff dielectric substrate 100 and the electrical element 56 is positioned on the standoff dielectric substrate 100 with the standoff dielectric substrate 63 and the electrical element 56 extending to the end faces 104 of the respective mounting dielectric substrates 100.

FIG. 7G illustrate the positioning of the mounting dielectric substrate 100 on the carrier 16 with the mounting dielectric substrate extending to the open end face 22 of the carrier 16. The standoff dielectric substrate 63 and the opto-electrical element 24 are positioned on the mounting dielectric substrate 100 with the standoff dielectric substrate 63 extending to the end face 104 of the dielectric substrate 100. The electrical element 56 is positioned in the shallow cavity 42 of the housing 40 with the electrical element extending past the open end face 48 of the housing 40. FIG. 7H illustrates the standoff dielectric substrate 63 and the opto-electrical elements 24 positioned on the carrier 16 with the standoff dielectric substrate 63 extending past the open end face of the carrier 16. The mounting dielectric substrate 100 is positioned in the shallow cavity 42 of the housing 40 and recessed from the open end face 48 of the housing 40. The electrical element 56 is positioned on the mounting dielectric substrate 100 and extends to the end face 104 of the mounting dielectric substrate 100. FIG. 7I illustrates mounting dielectric substrates 100 mounted on the carrier 16 and in the shallow cavity 42 of the housing 40. The end faces 104 of the mounting dielectric substrates 100 extend to the open end faces 22 and 48 of the carrier 16 and housing 40. The standoff dielectric substrate 63 and the opto-electrical and electrical elements 24 and 56 are positioned on the respective mounting dielectric substrates 100 with the standoff dielectric substrate 63 and the electrical element 56 extending to the respective end faces 104 of the mounting dielectric substrate 100.

FIG. 7J illustrate the positioning of the mounting dielectric substrate 100 on the carrier 16 with the mounting dielectric substrate extending past the open end face 22 of the carrier 16. The standoff dielectric substrate 63 and opto-electrical element 24 are positioned on the mounting dielectric substrate 100 with the standoff dielectric substrate 63 extending to the end face 104 of the mounting dielectric substrate 100. The electrical element 56 is positioned away from the open end face 48 of the housing 40. FIG. 7K illustrate the positioning of the mounting dielectric substrate 100 in the shallow cavity 42 of the housing 40 with the mounting dielectric substrate extending past the open end face 48 of the housing 40. The electrical element 56 is positioned on the mounting dielectric substrate 100 with the electrical element 56 extending to the end face 104 of the dielectric substrate 100. The standoff dielectric substrate 63 and the opto-electrical element 24 are positioned on the carrier 16 with the standoff dielectric substrate 63 extending to the open end face 22 of the carrier 16. FIG. 7L illustrates mounting dielectric substrates 100 mounted on the carrier 16 and in the shallow cavity 42 of the housing. The end faces 104 of the mounting dielectric substrates 100 extend past the open end faces 22 and 48 of the carrier 16 and housing 40. The standoff dielectric substrate 63 and the opto-electrical element are positioned on the mounting dielectric substrate 100 on the carrier 16 with the standoff dielectric substrate 63 extending past the end face of the mounting dielectric substrate 100. The electrical element 56 is positioned on the mounting dielectric substrates 100 in the shallow cavity 42 with the electrical element 56 extending past the end face 104 of the mounting dielectric substrate 100.

FIGS. 7M–7O illustrate the standoff dielectric substrate 63 abutting the electrical element 56 and positioned in the shallow cavity 42 of the housing 40. In FIG. 7M, the standoff dielectric substrate 63 and the electrical element 56 are recessed back from the open end face 48 of the housing 40 and the opto-electrical element 24 on the carrier 16 is recessed back from the open end face 22 of the carrier 16. In FIG. 7N, the standoff dielectric substrate 63 extends to the open end face 48 of the housing 40 and the opto-electrical element 24 extends to the open end face 22 of the carrier 16. In FIG. 7O, the standoff dielectric substrate 63 extends past the open end face 48 of the housing 40 and the opto-electrical element 24 extends to the open end face 22 of the carrier 16.

FIGS. 7P–7R illustrate a mounting dielectric substrate 100 positioned in the shallow cavity 42 of the housing 40 with the standoff dielectric substrate 63 and the electrical element 56 positioned on the mounting dielectric substrate 100. In each figure, the standoff dielectric substrate 63 extends to the end face 104 of the mounting dielectric substrate 100 and the opto-electrical element 24 on carrier 16 extends to the open end face 22 of the carrier 16. In FIG. 7P, the mounting dielectric substrate 100 is recessed back from the open end face 48 of the housing 40. In FIG. 7Q, the mounting dielectric substrate 100 extend to the open end face 48 of the housing 40. In FIG. 7R, the mounting dielectric substrate 100 extend past the open end face 46 of the housing 40.

FIGS. 7S–7X illustrate standoff dielectric substrates 63 abutting both the opto-electrical and electrical elements 24 and 56. In FIG. 7S, the standoff dielectric substrates 63 are recessed back from the open end faces 22 and 48 of the respective carrier 16 and housing 40. In FIG. 7T, the standoff dielectric substrates 63 extend to the open end faces 22 and 48 of the respective carrier 16 and housing 40. In FIG. 7U, the standoff dielectric substrates 63 extend past the open end faces 22 and 48 of the respective carrier 16 and housing 40. In FIG. 7V, mounting dielectric substrates 100 are positioned on the carrier 16 and in the shallow cavity 42 of the housing 40 adjacent to the open end faces 22 and 48 of the carrier 16 and housing 40. The standoff dielectric substrates 63 and their abutting opto-electrical and electrical elements 24 and 56 are positioned on the respective mounting dielectric substrates 100 with the standoff dielectric substrates 63 extending to the end faces 104 of the substrates 100. In FIG. 7W, a mounting dielectric substrate 100 is positioned on the carrier 16 with the opto-electrical element 24 and the standoff dielectric substrate 63 positioned on the mounting dielectric substrate 100. The standoff dielectric substrate 63 extends to the end face 104 of the mounting dielectric substrate 100. The standoff dielectric substrate 63 and the electrical element 56 are positioned in the shallow cavity 42 of the housing 40 with the standoff dielectric substrate 63 extending to the open end face 48 of the housing 40. In FIG. 7X, a mounting dielectric substrate 100 is positioned in the shallow cavity 42 of the housing 40 with the electrical element 56 and the standoff dielectric substrate 63 positioned on the mounting dielectric substrate 100. The standoff dielectric substrate 63 extends to the end face 104 of the mounting dielectric substrate 100. The standoff dielectric substrate 63 and the opto-electrical element 24 are positioned on the carrier 16 with the standoff dielectric substrate 63 extending to the open end face 22 of the carrier 16.

The above illustrated examples of the positioning of one or more standoff dielectric substrates 63 that abut the opto-electrical and electrical elements 24 and 56 on the carrier 16 and in the shallow cavity 42 of the housing 40 and the positioning of one or more mounting dielectric substrates 100 on the carrier 16 and in the shallow cavity of the housing 40 and the positioning of the standoff dielectric substrate or substrates 63 and the opto-electrical and electrical elements 24 and 56 on the mounting dielectric substrates 100 represent some but not all of the possible positioning configuration for the opto-electronic module 10. Each of the positioning locations for the standoff dielectric substrate or substrates 63 and the opto-electrical and electrical elements 24 and 56 relative to open end faces of the carrier 16 and housing 40 may equally be used in positioning the standoff dielectric substrate or substrates 63 and the opto-electrical and electrical elements 24 and 56 on the mounting dielectric substrate or substrates 100. Each of the positioning locations of the mounting dielectric substrate or substrates 100 may be used in conjunction with each opto-electrical and electrical section 12 and 14 or with both of the sections 12 and 14.

A butt joined opto-electronic module have been described with the various embodiments providing an apparatus that allows independent aligning in a proximate abutting relationship and electrical coupling of coplanar transmission structures formed on opto-electrical and electrical elements that are secured on respective independently positioned and mechanically joined open end face carrier and housing. Each opto-electrical and electrical element is positionable relative to the open end face of its carrier and housing. Each element may be positioned away from the open end face, extend to the open end face, or extend past the open end face with the lateral separation between the proximate abutting coplanar transmission structures being less than one millimeter. The carrier and housing may also include a mounting dielectric substrate on which is secured one of the opto-electrical and electrical elements. Each mounting dielectric substrate may be positioned away from the open end face of the carrier and housing, extend to the open end face of the carrier and housing, or extend past the open end face of the carrier and housing. Each element may be positioned away from the end face of its mounting dielectric substrate, extend to the end face of its mounting dielectric substrate, or extend past the end face of its mounting dielectric substrate. The carrier and housing are linearly and rotationally positionable relative to each other in three mutually perpendicular planes to align the coplanar transmission structures in the proximate abutting relationship. One or more tines on the carriers mate with one or more securing members in the housing to mechanically couple the carrier and housing together as a single module. The coplanar transmission structures are electrically coupled together using substantially flat electrical conductors. A standoff dielectric substrate may be butted against on both of the opto-electrical and electrical elements.

It will be obvious to those having skill in the art that many changes may be made to the details of the above-described embodiments of this invention without departing from the underlying principles thereof. The scope of the present invention should, therefore, be determined only by the following claims.

What is claimed is:

1. A butt joined opto-electronic module for millimeter wavelength frequencies comprising:

a housing having juxtaposed shallow and deep cavities defining an open end face between the shallow and deep cavities with an electrical element positioned in the shallow cavity having an electrical device formed on at least one horizontal surface of the electrical element and the deep cavity having at least a first upward extending strut with the upper portion of the strut having a securing member formed therein;

a carrier having an open end face and opposing horizontal surfaces with at least a first tine extending from the carrier, and an opto-electrical element positioned on the carrier with an opto-electrical device formed on at least one horizontal surface of the opto-electrical element coupled to receive an optical signal from an optical waveguide secured to the carrier;

first and second coplanar transmission structures with one of the coplanar transmission structures formed on at least one horizontal surface of the opto-electrical element and the other coplanar transmission structure formed on at least one horizontal surface the electrical element with each of the first and second coplanar transmission structures being electrically coupled to one of the respective opto-electrical and electrical devices, the first and second coplanar transmission structures being independently aligned relative to each other in three mutually perpendicular planes and positioned in a proximate abutting relationship;

the carrier being independently positioned in a proximate abutting relationship at the open end faces and mechanically joined together as a single assembly by securing the carrier tine to the securing member of the strut with the carrier being linearly and rotationally positionable in three mutually perpendicular planes relative to the open end faces to align the first and second coplanar transmission structures; and substantially flat electrical conductors electrically coupling the first and second coplanar transmission structures together.

2. The butt joined opto-electronic module as recited in claim 1 wherein first and second coplanar transmission structures have sub-millimeter lateral separation.

3. The butt joined opto-electronic module as recited in claim 1 further comprising at least a first mounting dielectric substrate having an end face with the mounting dielectric substrate mounted on one of the shallow cavity of the housing and the carrier and having one of the opto-electrical and electrical elements positioned thereon.

4. The butt joined opto-electronic module as recited in claim 3 further comprising at least a second mounting dielectric substrate having an end face with the second mounting dielectric substrate mounted on the other of the shallow cavity of the housing and the carrier and having the other of the opto-electrical and electrical elements positioned thereon.

5. A butt joined opto-electronic module for millimeter wavelength frequencies comprising:

a housing having juxtaposed shallow and deep cavities defining an open end face between the shallow and deep cavities with an electrical element positioned in the shallow cavity having an end face and an electrical device formed on at least one horizontal surface of the electrical element and the deep cavity having at least a first upward extending strut with the upper portion of the strut having a securing member formed therein;

a carrier having an open end face and opposing horizontal surfaces with at least a first tine extending from the carrier, and an opto-electrical element positioned on the carrier having an open end face and an opto-electrical device formed on at least one horizontal surface of the opto-electrical element coupled to receive an optical signal from an optical waveguide secured to the carrier;

first and second coplanar transmission structures with one of the coplanar transmission structures formed on at least one horizontal surface of the opto-electrical element and the other coplanar transmission structure formed on at least one horizontal surface of the electrical element with each of the first and second coplanar transmission structures being electrically coupled to one of the respective opto-electrical and electrical devices;

at least a first standoff dielectric substrate having opposing vertical end walls and at least one horizontal surface with a coplanar transmission structure formed on at least on horizontal surface and extending to the vertical end walls with one of the vertical end walls of the standoff dielectric substrate abutting the end face of one of the opto-electrical and electrical elements, the coplanar transmission structure of the abutting opto-electrical and electrical element and the coplanar transmission structure on the standoff dielectric substrate being coplanar and electrically coupled via substantially flat electrical conductors with the coplanar transmission structure of the standoff dielectric substrate and the coplanar transmission structure of the other element of the opto-electrical and electrical elements being independently aligned in three mutually perpendicular planes and in a proximate abutting relationship;

the carrier being independently positioned in a proximate abutting relationship at the open end faces and mechanically joined together as a single assembly by securing the carrier tine to the securing member of the strut with the carrier being linearly and rotationally positionable in three mutually perpendicular planes relative to the open end face to align the coplanar transmission structures of the standoff dielectric substrate and the other element of the opto-electrical and electrical elements; and substantially flat electrical conductors electrically coupling the coplanar transmission structures of the standoff dielectric substrate and the other element of the opto-electrical and electrical elements together.

6. The butt joined opto-electronic module as recited in claim 5 wherein coplanar transmission structures of the standoff dielectric substrate and the other element of the opto-electrical and electrical elements have sub-millimeter lateral separation.

7. The butt joined opto-electronic module as recited in claim 5 wherein first and second coplanar transmission structures and the standoff dielectric coplanar transmission structure are impedance and dimensionally matched.

8. The butt joined opto-electronic module as recited in claim 5 wherein first and second coplanar transmission structures are dimensionally mismatched and the coplanar transmission structure of the standoff dielectric substrate is an impedance maintaining dimensional transition coplanar waveguide structure.

9. The butt joined opto-electronic module as recited in claim 5 further comprising at least a first mounting dielectric substrate having an end face with the mounting dielectric substrate mounted on one of the shallow cavity of the housing and the carrier and having one of the standoff dielectric substrate abutting one of the opto-electrical and electrical elements and the other of the opto-electrical and electrical elements positioned thereon.

10. The butt joined opto-electronic module as recited in claim 9 further comprising at least a second mounting dielectric substrate having an end face with the second mounting dielectric substrate mounted on the other of the shallow cavity of the housing and the carrier and having the other of the opto-electrical and electrical elements positioned thereon.

11. The butt joined opto-electronic module as recited in claim 1 or 5 wherein the opto-electrical element comprises an optical-to-electrical converter.

12. The butt joined opto-electronic module as recited in claim 11 wherein the optical-to-electrical converter comprises a photodiode.

13. The butt joined opto-electronic module as recited in claim 1 or 5 wherein the opto-electrical element comprises a semiconductor laser.

14. The butt joined opto-electronic module as recited in claim 1 or 5 wherein the opto-electrical element comprises an optical modulator.

15. The butt joined opto-electronic module as recited in claim 1 or 5 wherein the electrical element comprises at least a first sampling diode.

16. The butt joined opto-electronic module as recited in claim 1 or 5 wherein the electrical element comprises a laser driver.

17. The butt joined opto-electronic module as recited in claim 1 or 5 wherein the housing further comprises a second upward extending strut with the upper portion of the second strut having a securing member formed therein.

18. The butt joined opto-electronic module as recited in claim 1 or 5 wherein the securing member comprises an axial bore formed in the upper portion of the strut.

19. The butt joined opto-electronic module as recited in claim 1 or 5 wherein the securing member comprises upward extending tabs extending from the top of the struts defining a recessed region between the tabs.

20. The butt joined opto-electronic module as recited in claim 1 or 5 wherein the carrier further comprises opposing side surfaces with tines extending from each of the side surfaces.

21. The butt joined opto-electronic module as recited in claim 1 or 5 wherein solder is applied to the securing member and the carrier tine.

22. The butt joined opto-electronic module as recited in claim 1 or 5 wherein an adhesive is applied to securing member and the carrier tine.

23. The butt joined opto-electronic module as recited in claim 22 wherein the adhesive is an epoxy.

24. The butt joined opto-electronic module as recited in claim 23 wherein the epoxy is an ultraviolet cured epoxy.

25. The butt joined opto-electronic module as recited in claim 1 or 5 wherein a strong adhesion low melting temperature metal is applied to the overlapping extension members.

26. The butt joined opto-electronic module as recited in claim 1 or 5 further comprising a removable top cover mounted on the housing over the shallow and deep cavities.

27. The butt joined opto-electronic module as recited in claim 1 or 5 wherein the substantially flat electrical conductors are wedge bonded electrical conductors.

* * * * *